(12) United States Patent
Minemura

(10) Patent No.: US 7,295,502 B2
(45) Date of Patent: Nov. 13, 2007

(54) OPTICAL DESK APPARATUS

(75) Inventor: Hiroyuki Minemura, Kokubunji (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 500 days.

(21) Appl. No.: 11/049,660

(22) Filed: Feb. 4, 2005

(65) Prior Publication Data
US 2005/0254389 A1 Nov. 17, 2005

(30) Foreign Application Priority Data
May 14, 2004 (JP) .............................. 2004-144327

(51) Int. Cl.
*B11B 7/00* (2006.01)
(52) U.S. Cl. ................. 369/59.11; 369/59.21; 369/124.11
(58) Field of Classification Search ...................... None
See application file for complete search history.

(56) References Cited
U.S. PATENT DOCUMENTS

| | | | | |
|---|---|---|---|---|
| 5,623,474 A | * | 4/1997 | Oshio et al. | 369/59.16 |
| 5,848,040 A | * | 12/1998 | Tanaka | 369/124.15 |
| 5,886,844 A | * | 3/1999 | Shimizu | 360/53 |
| 5,923,708 A | * | 7/1999 | Mutoh | 375/233 |
| 6,304,538 B1 | * | 10/2001 | Hayashi | 369/59.22 |
| 6,654,325 B1 | | 11/2003 | Minemura et al. | |
| 7,095,696 B2 | * | 8/2006 | Nakajima et al. | 369/59.12 |
| 2001/0043529 A1 | | 11/2001 | Minemura et al. | |
| 2005/0128918 A1 | * | 6/2005 | Park et al. | 369/60.01 |

* cited by examiner

*Primary Examiner*—Thang V. Tran
(74) *Attorney, Agent, or Firm*—Antonelli, Terry, Stout & Kraus, LLP.

(57) ABSTRACT

An error pulse is generated from a PRML circuit, and reproduction compatibility with a conventional apparatus is established. After a reproducing signal output from an optical head is equalized by an analog equalizer, sampled by an A/D converter at every clock, and digitally equalized by a FIR filter, the signal is binarized by a PRNL decoder. On the other hand, with regard to an error pulse, a level at an edge point is detected from an output signal of the A/D converter by an edge level detector, and the level at the edge point and an error pulse detection threshold are compared by an error pulse generator, and the error pulse is generated. Even when an optical apparatus having a trial writing function using conventional error pulse is provided with a PRML reproducing system for enabling high speed, the optical apparatus can execute trial writing using the error pulse as it is.

18 Claims, 31 Drawing Sheets

FIG. 3
CASE 1: PRML CLASS NUMBER = EVEN (EDGE POINT = CLOCK POINT)
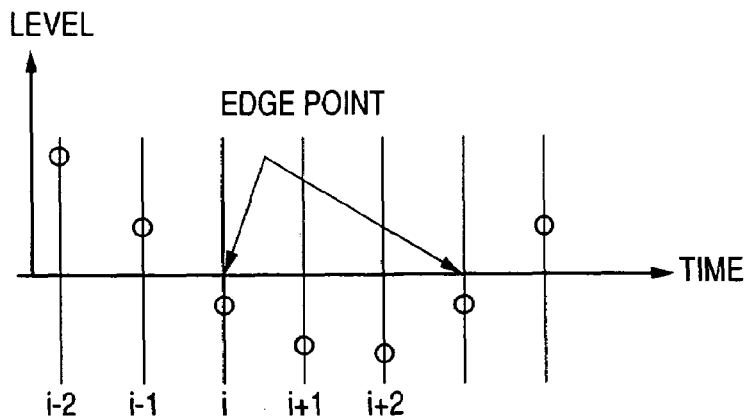
EDGE CONDITION:
$$y[i-1] \cdot y[i+1] < 0;$$
ERROR PULSE GENERATION CONDITION:
$$abs(y[i]) > Vth$$
CASE 2: PRML CLASS NUMBER = ODD (EDGE POINT ≠ CLOCK POINT)
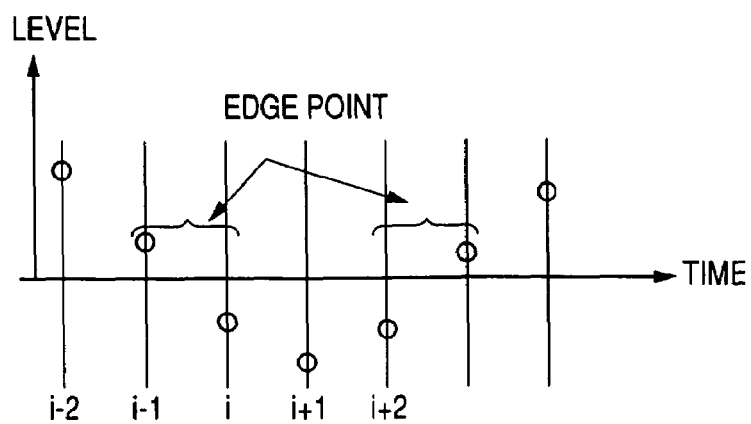
EDGE CONDITION:
$$y[i] \cdot y[i+1] < 0;$$
ERROR PULSE GENERATION CONDITION:
$$abs((y[i]+y[i-1])/2) > Vth$$

FIG. 9

| OBJECTIVE LENS NA | WAVE | EDGE SHIFT TABLES | |
|---|---|---|---|
| 0.60 | JITTER=5.2%, RESOLUTION=37% | LEADING EDGES<br>| SFP | 3T | 4T | 5T | ≥6T |<br>|---|---|---|---|---|<br>| 3T | 2 | 5 | 3 | -2 |<br>| 4T | -4 | 0 | -2 | -5 |<br>| 5T | -3 | 1 | -1 | -5 |<br>| ≥6T | 1 | 4 | 3 | -1 | | TRAILING EDGES<br>| ELP | 3T | 4T | 5T | ≥6T |<br>|---|---|---|---|---|<br>| 3T | -2 | -5 | -2 | 2 |<br>| 4T | 4 | 0 | 2 | 3 |<br>| 5T | 3 | -1 | 2 | 3 |<br>| ≥6T | -1 | -5 | -2 | 1 |<br>[UNIT = % / Tw] |
| 0.65 | JITTER=6.0%, RESOLUTION=61% | LEADING EDGES<br>| SFP | 3T | 4T | 5T | ≥6T |<br>|---|---|---|---|---|<br>| 3T | 2 | 8 | 8 | 4 |<br>| 4T | -7 | 1 | 0 | -3 |<br>| 5T | -8 | -1 | -1 | -5 |<br>| ≥6T | -4 | 2 | 2 | -1 | | TRAILING EDGES<br>| ELP | 3T | 4T | 5T | ≥6T |<br>|---|---|---|---|---|<br>| 3T | -3 | -8 | -8 | -4 |<br>| 4T | 6 | -1 | 0 | 3 |<br>| 5T | 8 | -1 | 2 | 5 |<br>| ≥6T | 4 | -3 | -1 | 2 |<br>[UNIT = % / Tw] |

EQUALIZING CONDITION: BOOST 5.5dB (DVD-RAM STANDARD)

FIG. 10A
CALCULATION AND MEASUREMENT CONDITIONS
| LEADING EDGES | | | | |
|---|---|---|---|---|
| SFP | 3T | 4T | 5T | ≥6T |
| 3T | 0 | + | + | + |
| 4T | − | 0 | 0 | 0 |
| 5T | − | 0 | 0 | 0 |
| ≥6T | − | 0 | 0 | 0 |
| TRAILING EDGES | | | | |
|---|---|---|---|---|
| ELP | 3T | 4T | 5T | ≥6T |
| 3T | 0 | − | − | − |
| 4T | + | 0 | 0 | 0 |
| 5T | + | 0 | 0 | 0 |
| ≥6T | + | 0 | 0 | 0 |
"+" SHIFT PATTERN RATE $R_+ = 21\%$
"−" SHIFT PATTERN RATE $R_- = 21\%$
DO NOT MOVE $= 58\%$
$$\sigma_{tot} = \sqrt{\sigma_0^2 + \Delta_+^2 \cdot R_+ + \Delta_-^2 \cdot R_-}$$
FIG. 10B
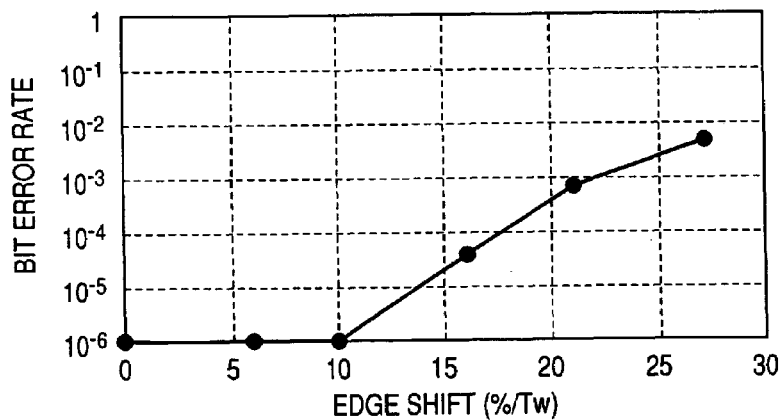
EDGE SHIFT VS. BIT ERROR RATE
FIG. 10C
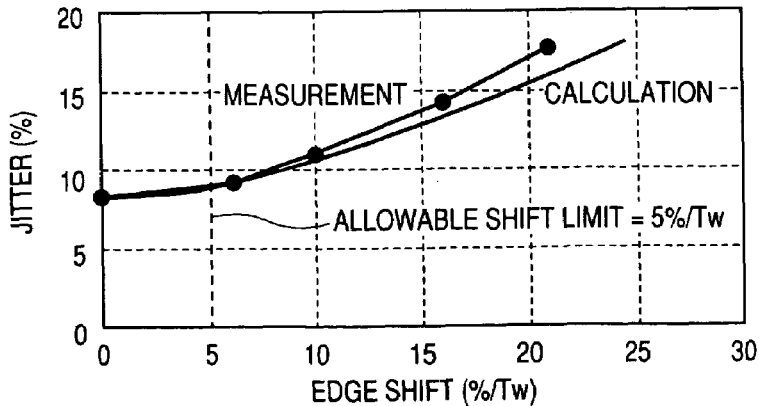
EDGE SHIFT VS. JITTER

FIG. 12

| OBJECTIVE LENS NA | WAVE | EDGE SHIFT TABLES | | | | | | | | | |
|---|---|---|---|---|---|---|---|---|---|---|---|
| 0.60 EQUALIZING: BOOST=5.5dB (DVD-RAM STANDARD) | JITTER=5.2%, RESOLUTION=37% | LEADING EDGES | | | | | TRAILING EDGES | | | | |
| | | SFP | 3T | 4T | 5T | ≥6T | ELP | 3T | 4T | 5T | ≥6T |
| | | 3T | 2 | 5 | 3 | -2 | 3T | -2 | -5 | -2 | 2 |
| | | 4T | -4 | 0 | -2 | -3 | 4T | 4 | 0 | 2 | 3 |
| | | 5T | -3 | 1 | -1 | -3 | 5T | 3 | -1 | 2 | 3 |
| | | ≥6T | 1 | 4 | 3 | -1 | ≥6T | -1 | -5 | -2 | 1 |
| | | [UNIT = % / Tw] | | | | | | | | | |
| 0.65 EQUALIZING: BOOST=4.0dB | JITTER=5.1%, RESOLUTION=52% | LEADING EDGES | | | | | TRAILING EDGES | | | | |
| | | SFP | 3T | 4T | 5T | ≥6T | ELP | 3T | 4T | 5T | ≥6T |
| | | 3T | 2 | 5 | 3 | -2 | 3T | -2 | -5 | -2 | 2 |
| | | 4T | -4 | 0 | -2 | -4 | 4T | 4 | 0 | 2 | 3 |
| | | 5T | -4 | 1 | -1 | -3 | 5T | 3 | -1 | 2 | 4 |
| | | ≥6T | 1 | 4 | 3 | -1 | ≥6T | -1 | -5 | -2 | 1 |
| | | [UNIT = % / Tw] | | | | | | | | | |

FIG. 17

| OBJECTIVE LENS NA | WAVE | EDGE SHIFT TABLES | | | | | | | | | |
|---|---|---|---|---|---|---|---|---|---|---|---|
| | | LEADING EDGES | | | | | TRAILING EDGES | | | | |
| 0.60<br><br>EQUALIZING:<br>BOOST=5.5dB<br>(DVD-RAM STANDARD) | JITTER=5.2%, RESOLUTION=37% | SFP | 3T | 4T | 5T | ≧6T | ELP | 3T | 4T | 5T | ≧6T |
| | | 3T | 2 | 5 | 3 | -2 | 3T | -2 | -5 | -2 | 2 |
| | | 4T | -4 | 0 | -2 | -3 | 4T | 4 | 0 | 2 | 3 |
| | | 5T | -3 | 1 | -1 | -3 | 5T | 3 | -1 | 2 | 3 |
| | | ≧6T | 1 | 4 | 3 | -1 | ≧6T | -1 | -5 | -2 | 1 |
| | | [UNIT = % / Tw] | | | | | | | | | |
| 0.65<br><br>EQUALIZING:<br>BOOST=5.5dB<br>(DVD-RAM STANDARD)<br>+<br>15Tap FIR(*) | JITTER=4.2%, RESOLUTION=38% | SFP | 3T | 4T | 5T | ≧6T | ELP | 3T | 4T | 5T | ≧6T |
| | | 3T | -1 | -1 | -1 | -2 | 3T | -1 | 0 | 1 | 2 |
| | | 4T | -2 | 0 | 0 | 0 | 4T | 0 | 0 | 0 | 0 |
| | | 5T | -1 | 0 | 0 | 0 | 5T | 0 | 1 | 1 | 0 |
| | | ≧6T | -1 | -2 | 0 | 0 | ≧6T | 0 | 1 | 2 | 1 |
| | | [UNIT = % / Tw] | | | | | | | | | |

FREQUENCY RESPONSE OF DVD-RAM STANDARD EQUALIZER

FREQUENCY RESPONSE OF THE COMPENSATION EQUALIZER FOR NA = 0.65

TAP COEFFICIENTS WERE OBTAINED FOR A PR CLASS (1, 2.8, 3.8, 3.8, 2.8, 1) BY AN EDGE-FOCUSED LSE METHOD

FIG. 20

| EQUALIZING CONDITION | WAVE | EDGE SHIFT TABLES | | |
|---|---|---|---|---|
| DVD-RAM STANDARD (5.5dB) | JITTER=5.2%, RESOLUTION=37% | LEADING EDGES<br>\| SFP \| 3T \| 4T \| 5T \| ≧6T \|<br>\| 3T \| 2 \| 5 \| 3 \| -2 \|<br>\| 4T \| -4 \| 0 \| -2 \| -3 \|<br>\| 5T \| -3 \| 1 \| -1 \| -3 \|<br>\| ≧6T \| 1 \| 4 \| 3 \| -1 \| | | TRAILING EDGES<br>\| ELP \| 3T \| 4T \| 5T \| ≧6T \|<br>\| 3T \| -2 \| -5 \| -2 \| 2 \|<br>\| 4T \| 4 \| 0 \| 2 \| 3 \|<br>\| 5T \| 3 \| -1 \| 2 \| 3 \|<br>\| ≧6T \| -1 \| -5 \| -2 \| 1 \| |
| DVD-RAM STANDARD + ADAPTIVE FIR FOR PR (3,4,4,3) | JITTER=7.7%, RESOLUTION=59% | LEADING EDGES<br>\| SFP \| 3T \| 4T \| 5T \| ≧6T \|<br>\| 3T \| 2 \| 10 \| 10 \| 6 \|<br>\| 4T \| -7 \| 1 \| 2 \| -1 \|<br>\| 5T \| -10 \| -2 \| 0 \| -5 \|<br>\| ≧6T \| -6 \| 1 \| 3 \| -2 \| | | TRAILING EDGES<br>\| ELP \| 3T \| 4T \| 5T \| ≧6T \|<br>\| 3T \| -2 \| -10 \| -11 \| -6 \|<br>\| 4T \| 7 \| -1 \| -2 \| 2 \|<br>\| 5T \| 10 \| 2 \| 0 \| 5 \|<br>\| ≧6T \| 7 \| -1 \| -2 \| 2 \| |

OBJECTIVE LENS NA = 0.60
ADAPTIVE FIR FILTER: 15Taps

AVERAGE EDGE SHIFTS IN CASE OF THE DVD-RAM STANDARD EQUALIZATION

AVERAGE EDGE SHIFTS IN CASE OF THE DVD-RAM STANDARD EQUALIZATION AND COMPENSATED BY A 15-TAP FIR FILTER

FIG. 25
| READ SPEED | STANDARD EQ | STANDARD EQ+FIR |
|---|---|---|
| 2X | JITTER=4.8% 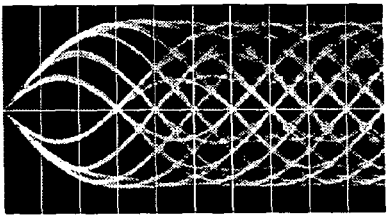 | JITTER=4.6% 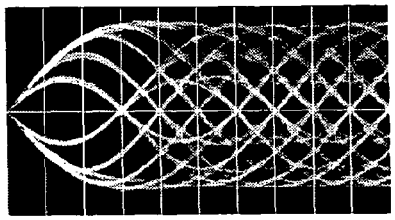 |
| 4X | JITTER=5.1% 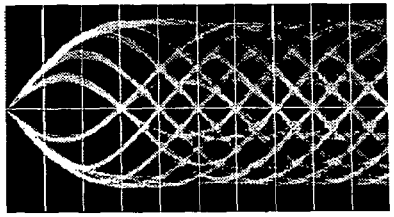 | JITTER=4.6% 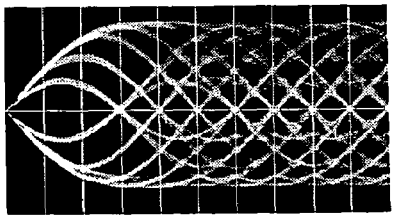 |
| 8X | JITTER=5.8% 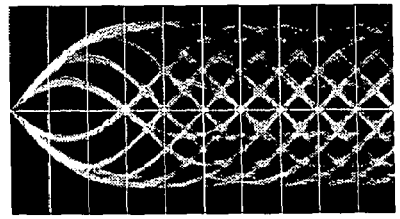 | JITTER=5.1% 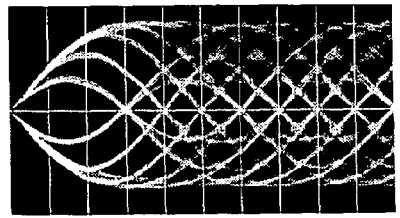 |
| 16X | JITTER=12.6% 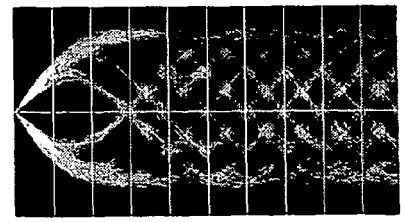 | JITTER=5.7% 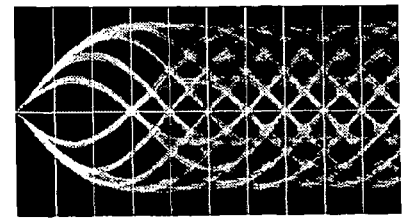 |

FIG. 26

| TAP | 2X | 4X | 6X | 8X | 10X | 12X | 14X | 16X |
|---|---|---|---|---|---|---|---|---|
| -7 | 0 | -0.040 | -0.059 | -0.052 | -0.051 | -0.048 | -0.034 | -0.037 |
| -6 | 0 | 0.022 | 0.061 | 0.044 | 0.043 | 0.028 | 0.002 | 0.009 |
| -5 | 0 | 0.037 | 0.020 | 0.039 | 0.053 | 0.062 | 0.071 | 0.068 |
| -4 | 0 | -0.069 | -0.091 | -0.099 | -0.117 | -0.122 | -0.114 | -0.139 |
| -3 | 0 | -0.004 | 0.007 | -0.002 | -0.018 | -0.022 | -0.017 | 0.009 |
| -2 | 0 | 0.087 | 0.105 | 0.122 | 0.149 | 0.168 | 0.176 | 0.211 |
| -1 | 0 | -0.035 | -0.041 | -0.043 | -0.025 | -0.023 | -0.020 | -0.045 |
| 0 | 1 | 0.909 | 0.907 | 0.899 | 0.892 | 0.908 | 0.909 | 0.890 |
| 1 | 0 | 0.073 | 0.062 | 0.073 | 0.047 | 0.015 | -0.012 | -0.005 |
| 2 | 0 | 0.135 | 0.151 | 0.184 | 0.215 | 0.241 | 0.227 | 0.218 |
| 3 | 0 | -0.107 | -0.083 | -0.112 | -0.091 | -0.065 | -0.032 | -0.028 |
| 4 | 0 | -0.130 | -0.157 | -0.191 | -0.224 | -0.251 | -0.218 | -0.176 |
| 5 | 0 | 0.138 | 0.098 | 0.133 | 0.112 | 0.088 | 0.057 | 0.044 |
| 6 | 0 | 0.037 | 0.102 | 0.083 | 0.104 | 0.122 | 0.091 | 0.052 |
| 7 | 0 | -0.054 | -0.082 | -0.079 | -0.089 | -0.099 | -0.085 | -0.071 |

INITIAL STATE

MINIMIZING OF ERROR PULSE

FIG. 29A
LEADING EDGE
FIG. 29B
TRAILING EDGE
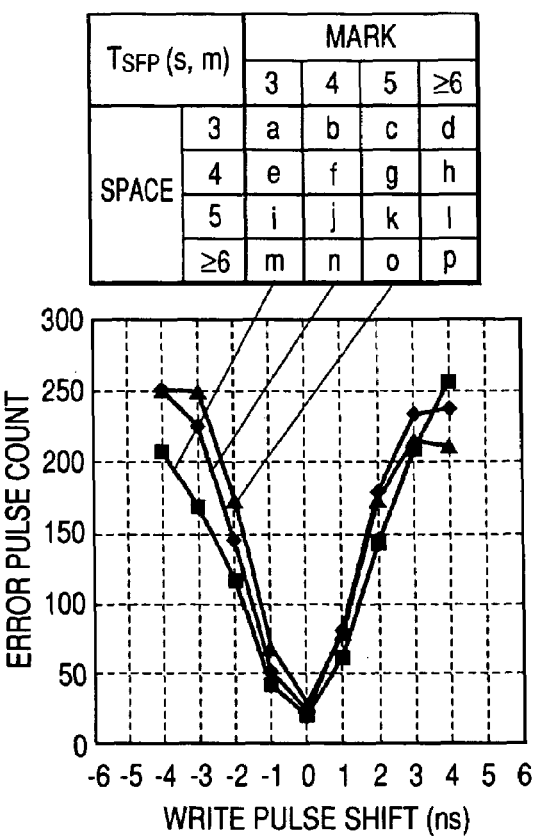
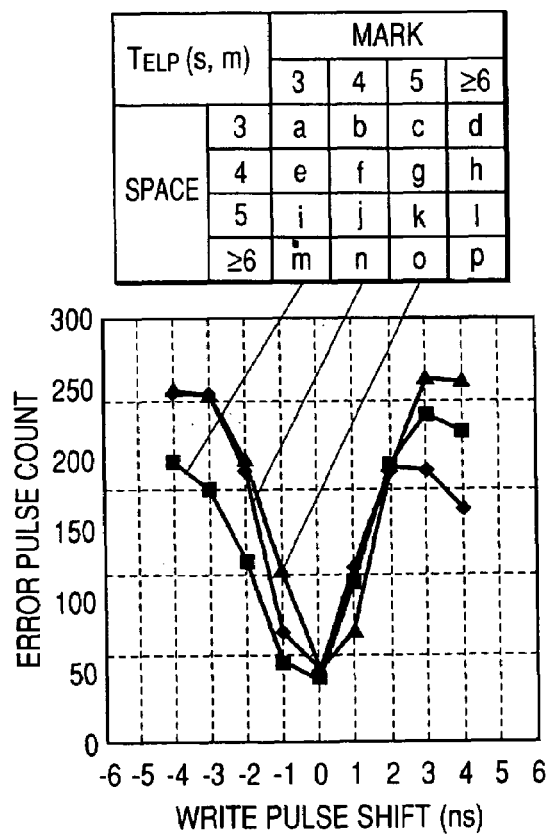

FIG. 31

| READ CONDITIONS | | WRITE/TEST-WRITE SPEED | | | |
| --- | --- | --- | --- | --- | --- |
| | | 1ST WRITE | | OVERWRITE 10 TIMES | |
| MEASUREMENT | SPEED | 6X | 16X | 6X | 16X |
| JITTER | 2X | 4.7% | 4.6% | 7.6% | 8.9% |
| | 6X | 5.2% | 5.3% | 7.8% | 8.9% |
| | 16X | 5.8% | 5.8% | 7.9% | 9.1% |
| BIT ERROR RATE BY PR(3,4,4,3)ML METHOD | 2X | $<10^{-7}$ | $<10^{-7}$ | $<10^{-7}$ | $4\times<10^{-7}$ |
| | 6X | $<10^{-7}$ | $<10^{-7}$ | $<10^{-7}$ | $4\times<10^{-7}$ |
| | 16X | $<10^{-7}$ | $<10^{-7}$ | $<10^{-7}$ | $4\times<10^{-7}$ |

OPTICAL DESK APPARATUS

CLAIM OF PRIORITY

The present application claims priority from Japanese application JP 2004-144327, filed on May 14, 2004, the content of which is hereby incorporated by reference into this application.

CO-PENDING APPLICATIONS

U.S. patent application Ser. No. 10/643,975, Ser. No. 10/774,587, and Ser. No. 10/933,321 are co-pending applications of the present application. The disclosures of these co-pending applications are incorporated herein by cross-reference.

FIELD OF THE INVENTION

The present invention relates to an optical disk apparatus that forms a recording mark, the physical property of which differs from another portion on a recording medium, and that records information.

BACKGROUND OF THE INVENTION

Optical disk media, such as a DVD-RAM and a DVD-RW, that use a rewritable type phase change optical recording material, have been available widely for general use. Usually, the optimization of the power and pulse conditions of a recording laser beam, called "trial writing", is important in the recording of information in these high-density optical disks.

Usually, a jitter, that is a standard deviation of the shift between a data edge and a clock edge, is used to estimate the quality of a signal recorded in an optical disk. A measuring apparatus, such as an exclusive jitter analyzer, is typically necessary to measure jitter. Because an expensive jitter analyzer cannot be incorporated in an optical disk apparatus as a practical matter, a signal estimation index was required instead of this expensive jitter analyzer.

As an example of a conventional trial writing technique, the technique of estimating jitter equivalently and optimizing the recording power using this value by generating a logical pulse, that is called an error pulse, and counting an error pulse count, instead of measuring the jitter directly, when the phase difference between a data edge and a clock edge exceeds a predetermined value, is disclosed in JP-A No. 320777/1998.

A trial writing technique for a 4.7 GB DVD-RAM that uses an adaptive recording strategy of a table reference type conforming to the front and rear space length and mark length is disclosed in the International Laid-Open Patent Publication No. WO01/011614. In accordance with this technique, classification processing is applied by making an error pulse correspond to a table of the recording strategy, and a pulse condition of a recording laser beam is optimized so that the error pulse values of table items may be minimized. Practical classification processing requires two 4×4 tables. However, because a logical pulse, called an error pulse, is used to estimate a signal, the classification processing can be realized simply by a logic LSI.

[Patent document 1] JP-A No. 320777/1998
[Patent document 2] WO01/011614

As described previously, at the present time, when the use of a DVD has become widespread, a fast recording/reproduction speed is becoming a most important technical development problem. Because the noise effect increases when a signal is reproduced at high speed, a PRML (Partial Response Maximum Likelihood) method that improves the S/N (Signal-to-Noise) ratio effectively is becoming indispensable as a binary system of a reproducing signal, instead of a conventional direct slice method. The PRML method requires a process of digitalizing the reproducing signal at every clock using an A/D (Analog-to-Digital) converter. Necessarily, a PLL (Phase-Locked Loop) circuit also changes from a conventional analog system to a digital system. In the PLL circuit of the digital system, a VCO (Voltage Controlled Oscillator) circuit is operated so that the level of the reproducing signal at an edge point may approach zero, instead of directly comparing the phase difference between a data edge and a clock edge. Because a conventional error pulse generation circuit adapts to a phase error detection circuit of the PLL of an analog system, it could not be adapted to a PLL of the digital system.

When a PRML method and a digital PLL are adopted in this manner, a conventional error pulse generation circuit will not function. When a new signal estimation index is introduced instead of an error pulse, the configuration of a conventionally developed logic LSI, and a control program resource will not be able to be used effectively.

Moreover, the PRML method executes binarization so that apparently the most accurate data row may be selected sequentially by comparing not only the position of the edge of a reproducing signal, but also the whole signal, with a target signal. In this case, about two to five numeric rows, called a PR class, are used to generate the target signal. The PR class allows an impulse response of the reproducing signal to approximate the numeric rows. A PR(3,4,4,3)ML method is well known as a PR class for a DVD. However, because the PR class approximates the impulse response to the end, for example, a write pulse or power is determined using a PR(3,4,4,3)ML decoder, so that signal estimation indexes peculiar to the PRML method, such as a bit error rate, a SAM (Sequenced Amplitude Margin), and an MLSE (Maximum Likelihood Sequenced Error) may be used so as to optimize these. In this case, because the write pulse or recording power differs from the waveform equalizing condition defined in the DVD standard, jitter increases when a signal is reproduced by a conventional apparatus, and the reproduction compatibility performance between optical disk apparatuses will be deteriorated.

Moreover, there are a DVD-RAM, a DVD-R, a DVD-RW, a DVD+R, and a DVD-RW as recording type DVD media. The use of one drive to enable recording/reproduction corresponding to these disks is anticipated. The numerical apertures of a reference drive head defined in these standards are 0.60 for the DVD-RAM, DVD-R, and DVD-RW, and 0.65 for the DVD+R and DVD+RW. A single optical head mounted on the drive must select either of the numerical apertures in order to correspond to all of these disks. Usually, it is natural to adopt the larger numerical aperture 0.65, and to record and reproduce a signal having a small spot size when considered from the point of view of signal quality or the efficiency of recording power in the case of high-speed recording. In this case, when the trial writing of a DVD-RAM is executed, the write pulse condition must be optimized using an optical head having an NA of 0.65 so that the signal is reproduced by an optical disk apparatus having an the of NA 0.60, and the jitter may be improved.

SUMMARY OF THE INVENTION

It is an object of the present invention to provide an optical disk apparatus that introduces a PRML method corresponding to a high-speed DVD, and which has a high accurate trial writing function. As a result of this, the following two problems are to be solved by the present invention.

(Problem 1) An attempt is made to generate an error pulse from a PRML circuit and to be able to make effective use of conventional logic LSI and control software resources.

(Problem 2) An attempt is made to prevent the jitter from deteriorating and the reproduction compatibility performance from being deteriorated when trial writing is executed depending on a PRML class or a numerical aperture of an optical head, and a signal is reproduced by a conventional apparatus.

First, a means for solving the (Problem 1) will be described.

FIG. 2 is a characteristic diagram showing an error-pulse detection principle. The detection window clock period Tw for binarization is the same as the clock pulse period. The error-pulse detection window clock period is made narrower than the period Tw. Accordingly, in edge shift distribution (=jitter distribution), the edge which protrudes outside of an error-pulse detection window is converted into an error-pulse. Consequently, when the error-pulse (logical pulse) is minimized, a write pulse condition under which an edge shift is minimal can be obtained.

FIG. 3 shows an error pulse generation condition corresponding to a data row in which a reproducing signal was sampled at every clock and converted digitally corresponding to a PRML method. In the figure, an edge level is reduced to zero. Because the reproducing signal is sampled at every clock, the absolute value of a sampling level at an edge point increases as the edge shift increases. Accordingly, in order to generate an error pulse, the absolute value of the sampling level at the edge point should be compared with a threshold. The PRML method includes a case (Case 1 in the drawing) where an edge position of the reproducing signal is sampled, and a case (Case 2 in the drawing) where it is shifted only for a half clock and sampled, according to the selection of a class number. With regard to each case, an edge condition and the error pulse generation condition are collected below. In the drawing, the reproducing signal sampled in the "i"th place is y[i], the edge level is 0, and the level threshold for generating the error pulse is Vth.

(Case 1) When an edge point is a sampling point,

Edge condition: y[i−1]×y[i+1]<0

Error pulse generation condition: |y[i]|>Vth (Case 2) When an edge point is located between two sampling points, Edge detection condition: y[i−1]×y[i]<0

Error pulse generation condition: |(y[i−1]+y[i])/2|>Vth

In the Case 2, because an edge level is not sampled directly, the edge level is handled as the mean value of the levels at two sampling points. By using such a method, a single error pulse that corresponds to the edge is generated when an edge shift is basically higher than a threshold.

FIG. 4 is a graph showing a sampled reproducing signal data row, a binary signal (hereinafter referred to as an NRZ signal), and an error pulse in more detail to facilitate an understanding of the present invention. The reproducing signal is standardized within ±1 through an AGC (Automatic Gain Control) circuit before it is A/D-converted. The drawing shows the case where the trailing edge shift of the 4T mark is large in the 8T-3T-3T-3T-4T-3T pattern. In the above description, an example in which the absolute value of the sampling level and the threshold Vth is compared was considered. On the contrary, the drawing shows that the error pulse having a 1Tw clock period is generated when the sampling level at an edge point is outside this range, assuming that the threshold is ±Vth. With regard to the NRZ signal, a mark is set to "1" and a space is set to "0" in accordance with the custom, and the mark shows a reproducing signal the reflectivity of which is smaller. These are illustrated along with the general characteristics of a phase change optical disk of the type used in a DVD-RAM. In the trailing edge of the 4T mark, the sampling point becomes larger than Vth, and an error pulse having the 1Tw clock period is generated. The error pulse clock pulse should also be 2Tw because the minimum run length of a DVD is 3Tw.

FIG. 5 shows the configuration of an error pulse generation circuit. After a reproducing signal 50 is equalized by a DVD standard (analog) equalizer 11, the signal is sampled at every clock by an A/D converter 12. An edge level detector 21 detects the level of an edge point that satisfies the edge condition shown above, and an error pulse generator 22 compares the detected level of the edge point and an error pulse detection threshold 54 and generates an error pulse 52.

Next, a threshold Vth will be described. The Vth value must reflect a data edge shift.

FIGS. 6A and 6B show an eye pattern of a reproducing signal for a DVD-RAM. This is calculated using a scalar diffraction simulation. FIG. 6A shows a head readout wave output from an optical head. Because an edge position depends on mark length, an edge shift is too large on the whole to be binarized satisfactorily. FIG. 6B is an equalized wave that has been equalized by a 3-Tap FIR filter (tap coefficient=[−0.3, 0, 1.6, 0, −0.3]) that is the DVD-RAM standard equalizing condition and a 6th order Bessel LFP. The edge shift is improved greatly.

In a signal whose edge shift was improved by appropriate waveform equalization, an edge position is aligned independently of mark length. At this time, when attention is paid to the fact that the inclination of a reproducing signal is also aligned in the vicinity of an edge point, a method of setting the error pulse threshold Vth can be obtained simply.

FIG. 7 shows sign wave approximation in which a 3T repetition signal that is the minimum run length was superimposed on an equalized reproducing signal. Because appropriate equalization processing is applied, the inclination of the reproducing signal is aligned in the vicinity of an edge point, and the reproducing signal in the vicinity of the edge point makes it possible to perform sine wave approximation independently of mark length. When the reproducing signal approaches a sine wave in the vicinity of the edge point, the relationship between an error pulse detection window clock period (direction of time) and the error pulse detection threshold Vth (direction of a level) can be decided uniquely.

FIG. 8 is a graph showing the relationship between an error pulse detection window clock period and an error pulse detection threshold. The detection threshold Vth standardizes the one-side amplitude of a reproducing signal for Sop. As described previously, when the signal amplitude is standardized within ±1 through use of an AGC circuit, Sop=1. Moreover, the ratio of the signal amplitude of the densest signal (3Tw) to the coarsest signal (14Tw) is defined as resolution, and the relationship is shown in the case where the resolution ranges from 10% to 100%. In case of a DVD, the resolution ranges from 30% to 60%. According to JP-A No. 320777/1998, the proper detection window clock period is said to range from 40% to 60%. Accordingly, the detection threshold Vth/Sop, in which the region hatched in the figure is standard, should be set within the range of 0.00 to 0.18.

The principle of an error pulse generation method, the circuit configuration, and the detection threshold setting range were described above. As a result, the (Problem 1) was solved.

Next, the means for solving the (Problem 2) will be described. Here, a solution means is described with respect to a method for calculating a proper recording condition of a DVD-RAM disk as an example by using an optical head having the numerical aperture 0.65 of an objective lens.

FIG. 9 compares a DVD-RAM reproducing signal in an apparatus having an objective lens with the numerical apertures 0.60 and 0.65. Here, the recording condition is adjusted using a 2×-speed DVD-RAM disk available on the market so that the jitter may be minimized in an apparatus having a numerical aperture of 0.60. The reproducing signal as seen in the drawing is an eye pattern after the signal recorded in a groove first is equalized under the DVD-RAM standard equalizing condition. The reproducing signal of the apparatus having a numerical aperture of 0.60 has a jitter of 5.2%, and has a resolution of 37%. When the same sector was reproduced in an apparatus having a numerical aperture of 0.65, the jitter amounted to 6%, and the resolution amounted to 61%. The difference in the reproducing signals originates in the fact that the shape of an optical spot caused by the numerical aperture differs. Because the jitter is satisfactory in either apparatus, the ECE error (PI error) is zero also in both, and no problem arises in the signal reproduction. In the figure, edge shift measured values to the 4×4 patterns at the leading and tailing edges are shown in tables. In the case of an apparatus having a numerical aperture of 0.60, because the recording condition was adjusted using these values, the edge shifts are less than 5%/Tw.

On the other hand, when a signal is reproduced in an apparatus having a numerical aperture of 0.65, the maximum edge shift value increases to 8%. The hatched portion in the figure shows an edge in which the difference of both edge shifts exceeds 5%/Tw. Here, a problem arises when the recording condition is adjusted in apparatus having a numerical aperture of 0.65. Similarly, the recording condition is adjusted so that the edge shift of each pattern may be minimized. Subsequently, when the signal is reproduced in an apparatus having a standard numerical aperture of 0.60, the shift increases, and the quality of the reproducing signal deteriorates.

A means for solving this problem will be described, and the allowable value of the difference of the edge shift must be shown.

FIGS. 10A to 10C show results in which the allowable shift limit of the edge shift was obtained. In FIG. 9, the difference of an edge shift caused by the difference of the numerical aperture increases in a pattern including the 3T mark and the 3T space, and it reflects the difference in the size of an optical spot. However, in the 3T mark-the 3T space pattern, the difference of the edge shift is small. This depends on the fact that the edge position does not vary even if the spot size is varied. In spite of this, the amplitude varies because the 3T-3T repetition signal is of a sine wave shape. Thereupon, as shown in FIG. 10A, the edge only for the hatched portion is shifted in the pattern at the leading and trailing edges, and an experiment and calculation were compared. "+" or "−" in the figure shows the direction of the shift and shows the direction of the edge shift when the size of the optical spot is reduced and the resolution is changed. The data patterns to be recorded are 8 to 16 modulation signals conforming to the DVD-RAM standard. Assuming that the shift pattern rates are 21% ($R_+$ and $R_-$), respectively, the shifts are $\Delta\sigma_+$ and $\Delta_-$ ($\Delta\sigma_+ = \Delta\sigma_-$ this time), respectively, and the jitter of the average fluctuation of each edge is $\sigma_0$, the composite jitter $\sigma_{tot}$ of multi-Gaussian distribution can be expressed as:

$$\sigma_{tot} = Sqrt\left(\sigma_0^2 + \Delta_+^2 \frac{2}{+} R_+ + \Delta_-^2 \frac{2}{-} R_-\right) \quad \text{(Formula 1)}$$

FIG. 10B is an experimental result in which an edge shift is generated by changing a write pulse condition. Then, the relationship between the edge shift and a bit error rate is examined in accordance with the above-stated condition. At this point, assuming a DVD-RAM normal operating condition, an overwrite is executed 10 times in five consecutive tracks, and the central track signal is estimated. The minimum jitter was 8.4%. As shown in the figure, when the edge shift exceeded 10%, the bit error rate tends to increase.

FIG. 10C shows a result in which edge shift and jitter were measured in the same experiment. The value of the jitter calculated from the Formula I is included in the drawing. Comparatively satisfactory matching can be seen between a measurement result and a calculation result. The allowable shift limit of the edge shift for maintaining jitter of less than 9% of the specification value proved to be 5%/Tw. The value 5%/Tw shall be the allowable shift limit of the edge shift in trial writing later.

FIG. 11 shows a result in which the relationship between the boost and the jitter in equalization processing is compared in apparatuses having numerical apertures of 0.60 and 0.65. The reproduced track is the foregoing first recording track. In an apparatus having a numerical aperture of 0.60, the jitter is minimized in a DVD-RAM standard boost of 5.5 dB. On the other hand, in an apparatus having a numerical aperture of 0.65, the jitter is minimized when the boost is 4.0 dB. As a result, the difference in the spot size of both the apparatuses proves to be about 1.5 dB when converted into the boost.

Under the condition where a jitter is minimized, because the edge shift is also reduced, the edge shift of each pattern was measured in an apparatus having a numerical aperture of 0.65 and under the condition of a boost of 4.0 dB. FIG. 12 shows the result. Even in the apparatus having a numerical aperture of 0.65, the jitter is improved and amounts to 5.1%, and the edge shift amounted to less than 5%/Tw. Accordingly, even if trial writing is executed under this reproducing condition, and a recording condition is set so that the edge shift may be minimized, the increase in the jitter can be set within an allowable range when a signal is reproduced in an apparatus having the standard numerical aperture of 0.60.

The reproducing condition for trial writing in an apparatus having a numerical aperture of 0.65 has been described here. In the following description of the embodiments, a reproducing condition for the trial writing that guarantees compatibility, such as when the optimum equalizing condition used for a PRML class, and a recording reproduction speed that is made fast up to 16×-speed, will be described based on an experimental result.

With this, the (Problem 2) of the present invention was solved. The method described here fixes the boost in an apparatus having a different numerical aperture and executed trial writing under this condition so that the jitter of the track recorded and adjusted by a standard apparatus may be minimized. As shown in the following embodiments, also when a PRML decoder is used or when the recording speed differs, a separate solution method is presented respectively. However, the purpose of the present invention is consistent, and to execute trial writing under a reproducing condition that is compatible with a reproducing system of the standard apparatus.

An optical disk apparatus into which a PRML system is introduced corresponding to a high-speed DVD by using the optical disk apparatus of the present invention, and which has a high accurate trial writing function, was able to be provided. As a result of this, the following two points are obtained as the effects of the present invention.

(Effect 1) An attempt was made to generate an error pulse from a PRML circuit, and to be able to make effective use of conventional logic LSI and control software resources.

(Effect 2) An attempt was made to able to execute trial writing that guarantees reproduction compatibility with a standard apparatus even in an optical disk apparatus that differs in numerical aperture.

BRIEF DESCRIPTION OF THE DRAWINGS

Preferred embodiments of the present invention will be described in detail based on the drawings, wherein:

FIG. 3 is a diagram which shows an error pulse generation condition relative to a data row in which a reproducing signal is sampled every clock and digitally converted, corresponding to a PRML system;

FIGS. 6A and 6B are eye pattern of a DVD-RAM reproducing signal, wherein FIG. 6A shows a head readout wave output from an optical head, and FIG. 6B shows an equalized wave;

FIG. 9 is a diagram which compares the DVD-BAM reproducing signal in apparatuses having an objective lens with numerical apertures of 0.60 and 0.65;

FIGS. 10A to 10C are diagrams which show results in which there is an allowable shift limit of an edge shift;

FIG. 12 is a diagram which shows a result in which the edge shift of each pattern is measured under the condition of a boost of 4.0 dB in an apparatus having a numerical aperture of 0.65;

FIG. 17 is a diagram which shows another result in which the edge shift of 20 each pattern is measured in apparatuses having numerical apertures of 0.65 and 0.60;

FIG. 20 is a diagram which shows the reproducing signal between a DVD-RAM standard equalizing condition and an equalizing condition that was optimized to a PR(3,4,4,3)ML and a difference in the edge shift;

FIG. 25 is a diagram which shows the eye pattern and the jitter at each speed when the reproduction and compensation are applied and not applied;

FIG. 26 is a table which shows tap coefficients of the FIR filter for the reproduction and compensation at each speed;

FIGS. 29A and 29B are diagrams which show an example of the trial writing that determines a write pulse of the 2×-speed DVD-RAM medium available on the market;

FIG. 31 is a table showing trial writing results of the 6×- to 16×-speed DVD-RAM media.

DETAILED DESCRIPTION OF THE PREFERRED EMBODIMENTS

The details of the present invention will be described below with reference to the drawings.

First Embodiment

Trial Writing Circuit

Figure 1:
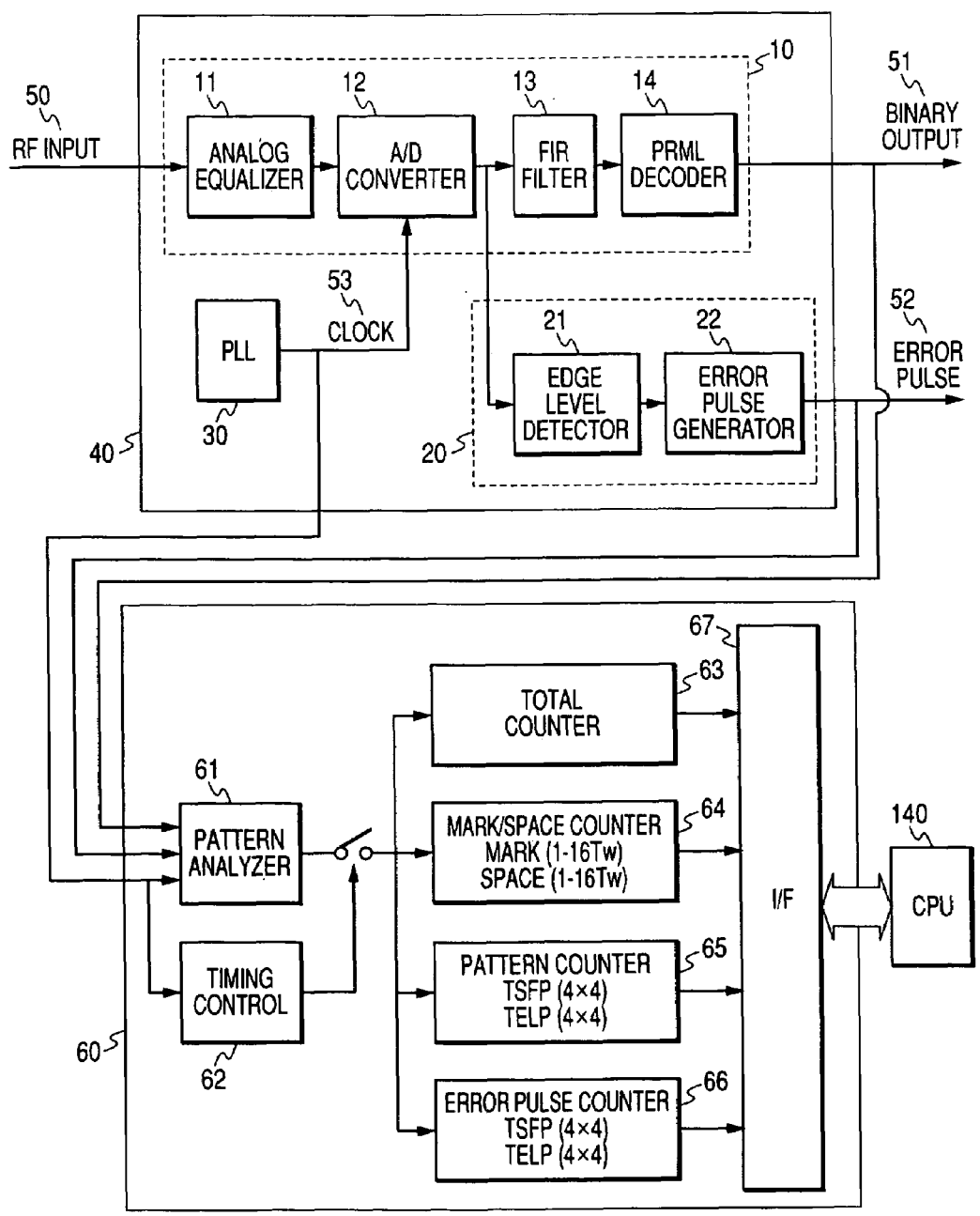
FIG. 1 is a block diagram showing an embodiment of a trial writing circuit suitable for an optical disk apparatus of the present invention.
Figure 2:
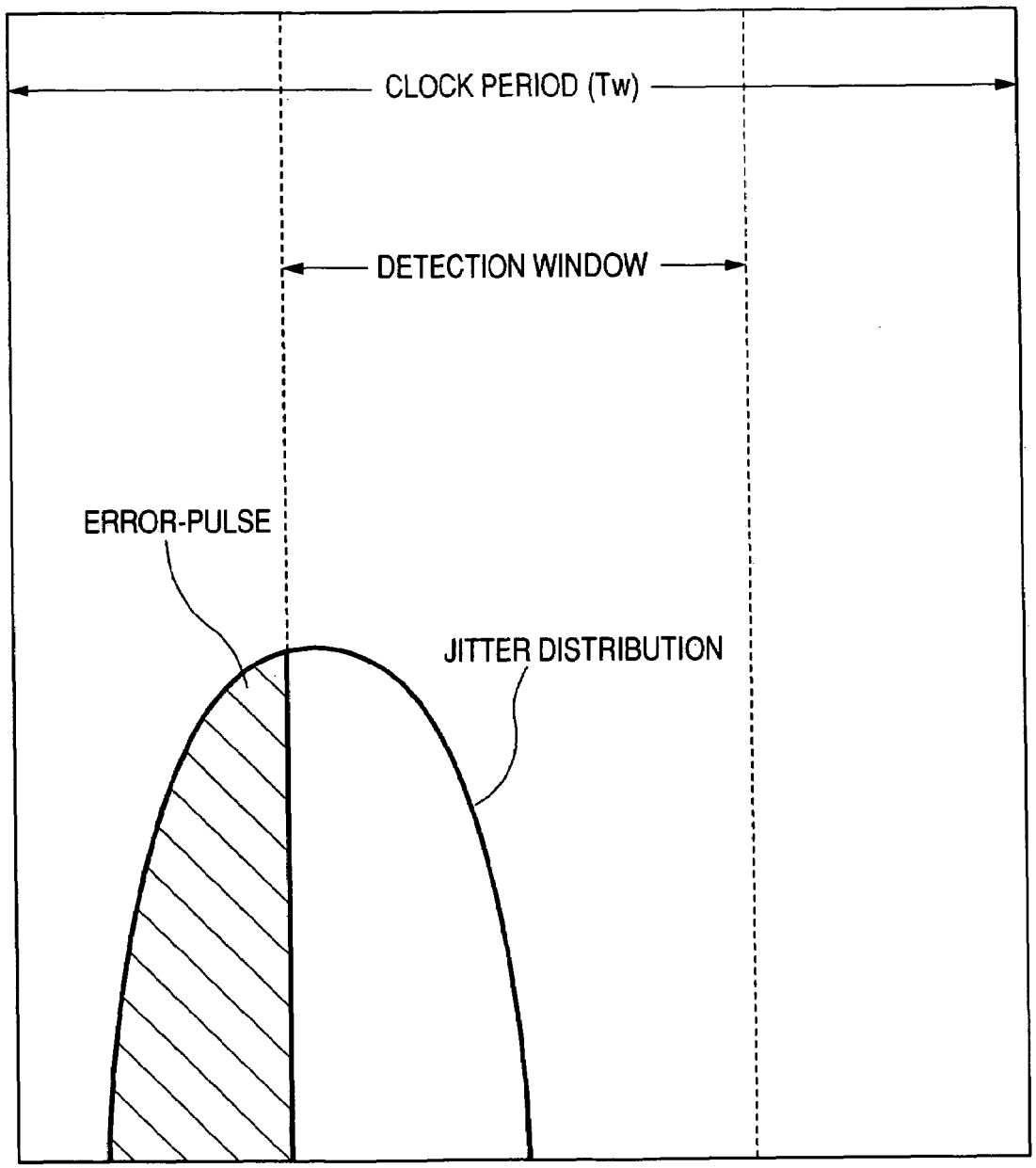
FIG. 2 is a characteristic diagram showing an error pulse detection principle.
Figure 4:
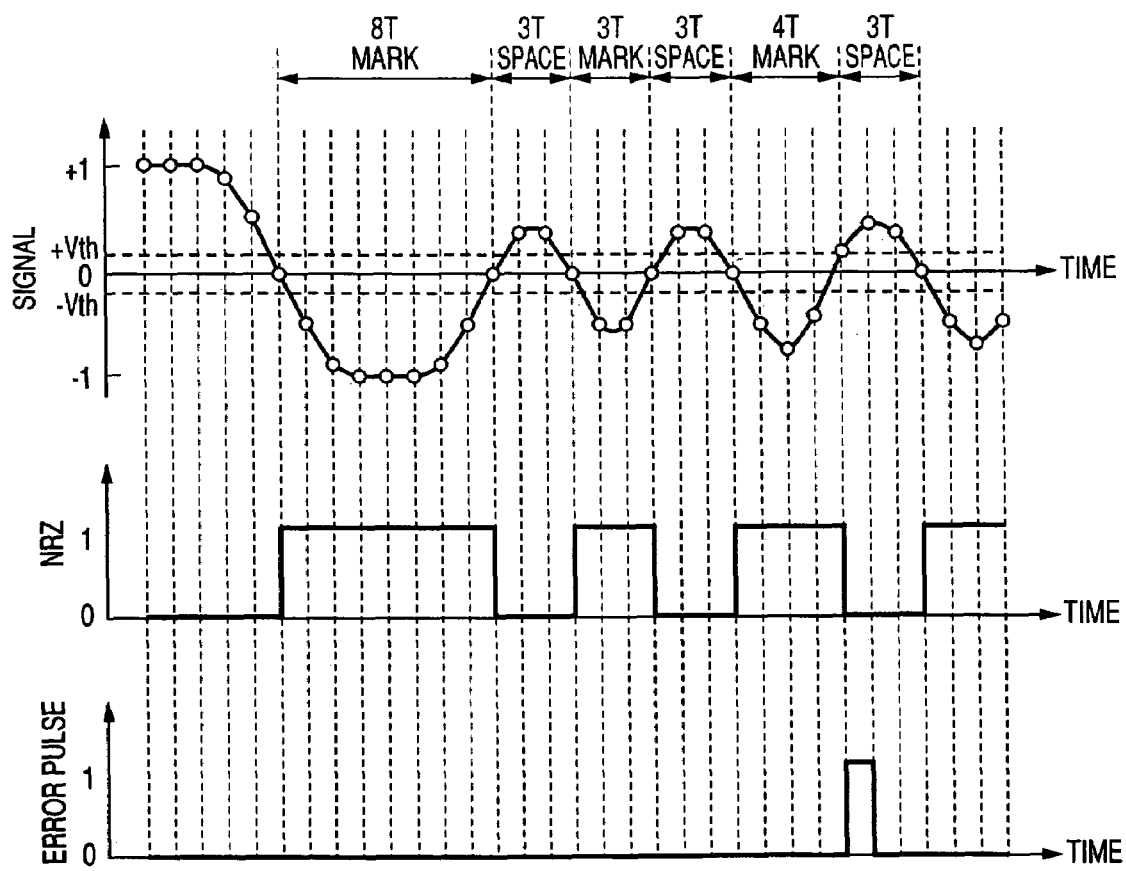
FIG. 4 is a graph showing the data row of the sampled reproducing signal, a binary signal, and an error pulse in more detail to facilitate an understanding of the present invention.
Figure 5:
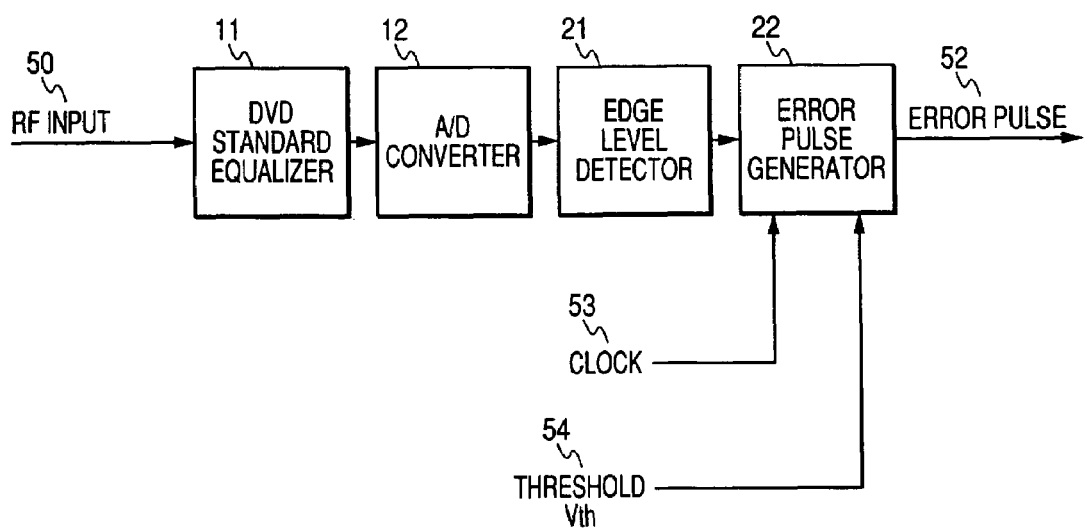
FIG. 5 is a block diagram showing the configuration of the error pulse generation circuit.
Figure 6A:
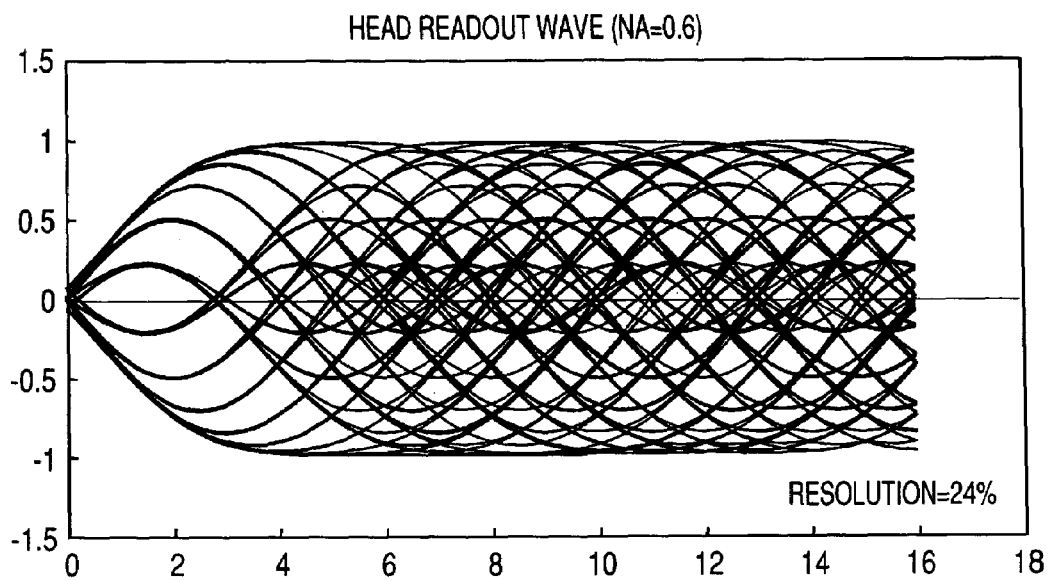
Figure 6B:
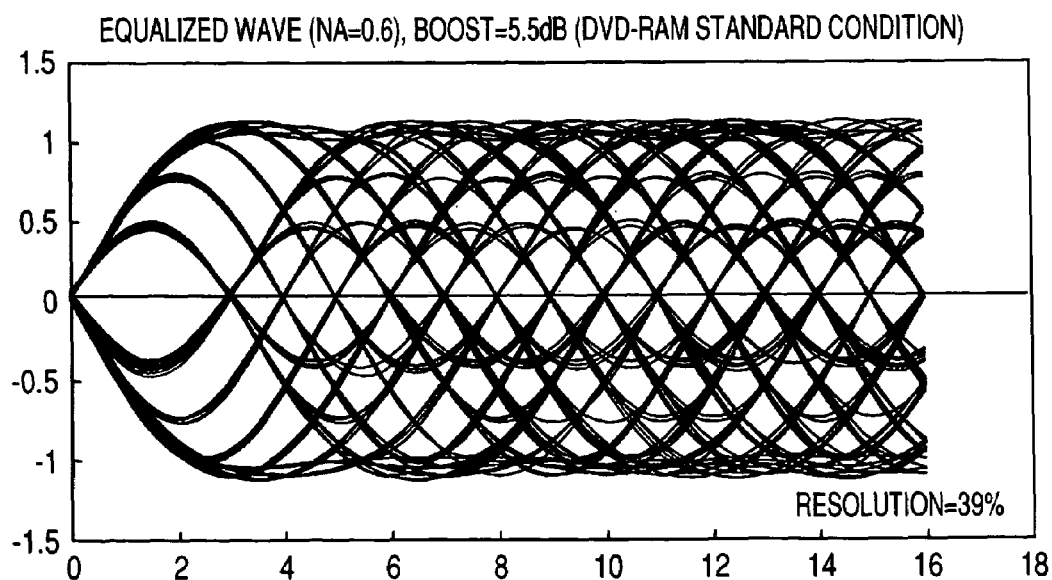
Figure 7:
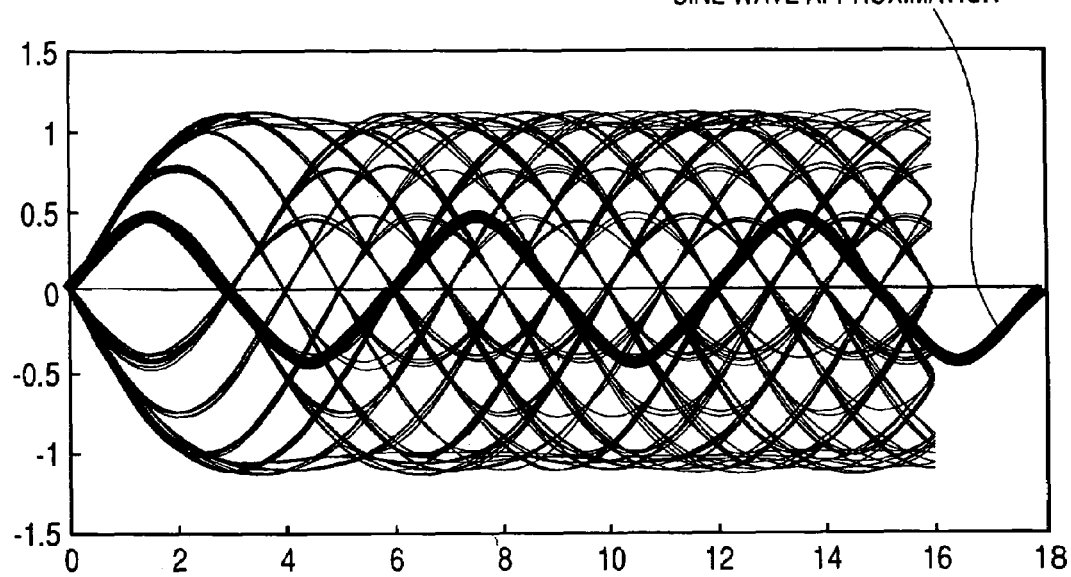
FIG. 7 is an eye pattern which shows sine wave approximation in which a 3T repetition signal was superimposed on an equalized reproducing signal.
Figure 8:
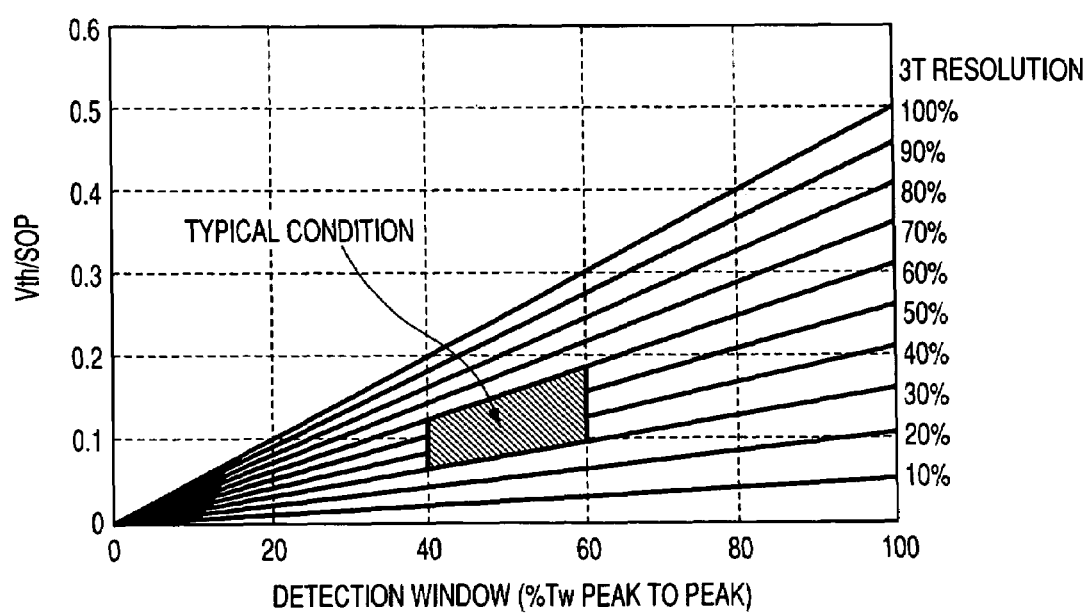
FIG. 8 is a graph showing the relationship between an error pulse detection window cock period and an error pulse detection threshold.
Figure 11:
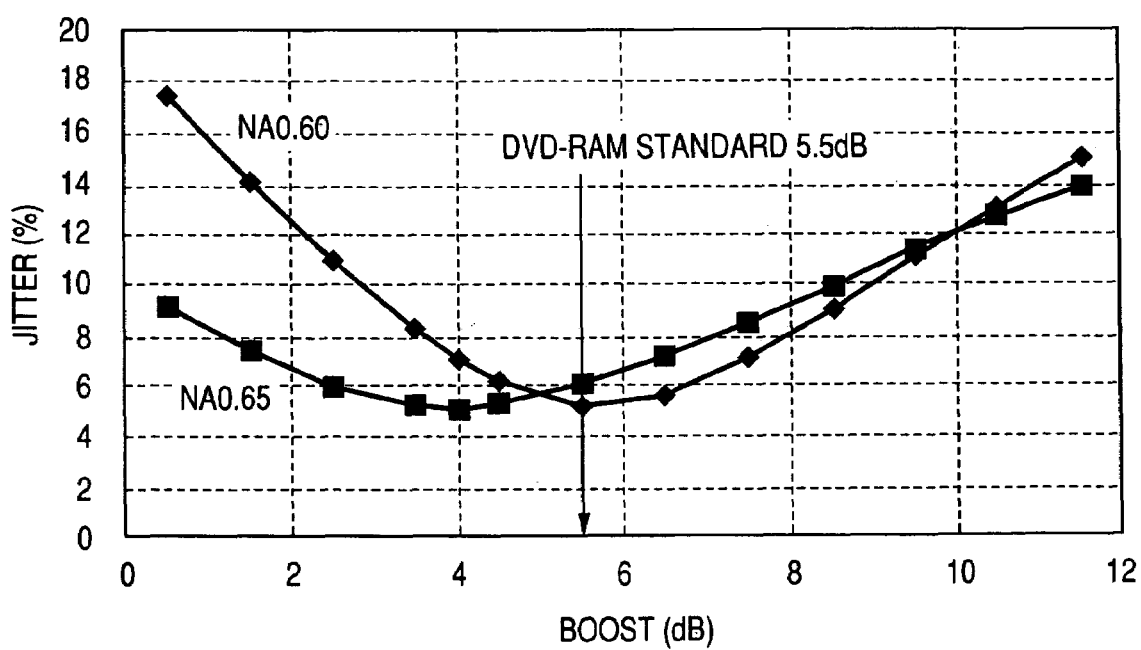
FIG. 11 is a graph which shows a result for the relationship between boost and jitter in equalizing processing in apparatuses having numerical apertures of 0.60 and 0.65.

FIG. 1 shows an embodiment of a trial writing circuit suitable for an optical apparatus of the present invention. The circuit has a reproducing signal processing circuit 40 and a logical signal processing circuit 60. The reproducing signal processing circuit 40 has a data reproduction circuit 10 of a PRML system, an error pulse generation circuit 20, and a PLL circuit 30. After a reproducing signal 50 that has been output from a head is equalized by an analog equalizer 11, the signal is sampled at every clock by an A/D converter 12. After this signal is equalized by a FIR filter 13, the signal is binarized by a PRML decoder 14, and a binary signal 51 is output. With regard to the generation of an error pulse, the signal sampled by the A/D converter 12 is assumed as an input, and a level at an edge point is detected by an error pulse detector 20 which has an edge level detector 21 and an error pulse generator 22, which compares the edge point level and an error pulse detection threshold and generates an error pulse 52. The PLL circuit 30 generates a clock from a reproducing signal, and it supplies the clock to each circuit.

The logical signal processing circuit 60 receives the binary signal 51, the error pulse 52, and a clock 53 as input signals. A pattern analyzer 61 classifies a pattern into a 4×4 table at the leading and trailing edges, respectively, in the same manner as a recording strategy. A timing control 62 performs timing control for integrating these pulses in a specified region, usually, in a sector in case of a DVD-RAM. A total counter 63 splits the specified region into multiple regions, and integrates all error pulses, as disclosed in JP-A No. 320777/1998. A mark/space counter 64 adds a mark and a space every separate length. A pattern counter 65 and an error pulse counter 66 correspond to the above-mentioned 4×4 table. The former counts the number of edge patterns, and the latter counts an error pulse count every edge pattern. In trial writing, a write pulse condition should be selected using as occurrence frequency of an error pulse in which the value of the measured error pulse counter 66 is divided by the value of the pattern counter 65, so that this occurrence frequency may be minimized.

At this time, the value of the mark/space counter 64 and the value of the pattern counter 65 are monitored and compared with the number of separate edges included in the recorded trial writing pattern. Consequently, when these differences are large, a defect, and an abnormality in the locked state of a PLL clock are monitored. Moreover, when a write pulse is changed greatly, for example, the intention of recording a 3T mark is very important even for detecting an abnormal case where the pulse width is too wide and a 4T mark will be recorded. In order to minimize the error pulse count and optimize the write pulse, trial writing must be executed only within the range where these abnormal states are not detected. Only when such a protection mechanism is mounted, an edge shift of less than 5%/Tw can be realized in a drive apparatus. When these counter values are fetched in a CPU 140 through an interface 67 and processed appropriately, the trial writing is executed. Further, the value of the total counter 63 is used for the trial writing when recording power is determined, as disclosed in JP-A No. 320777/1998.

In order to fix a recording condition using this circuit, a condition under which error pulse counts are minimized should be found in a state in which a specific pattern is recorded in a disk changing power and pulse conditions, and the specific pattern is reproduced, then an abnormal state is not detected.

FIGS. 13 to 16 show another embodiment of a reproducing signal processing circuit of the present invention. In each of the drawings, only reproducing signal processing is shown, and the items common to FIG. 1 are used with regard to a logical signal processing circuit.

Figure 13:
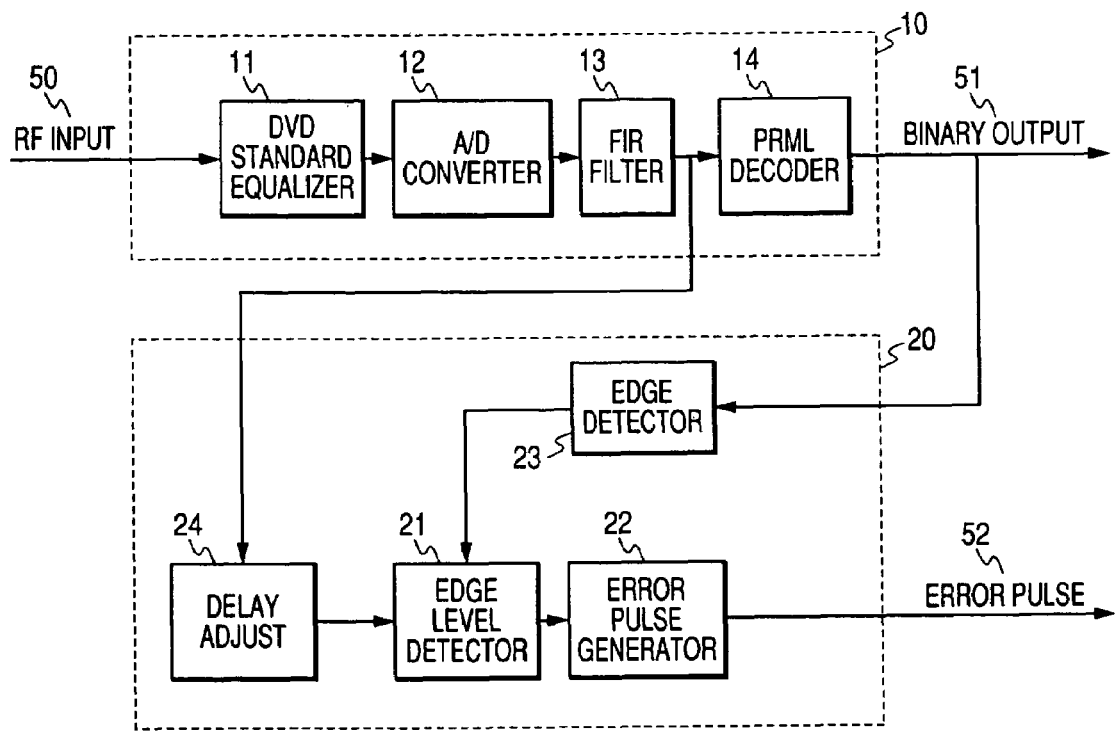
FIG. 13 is a block diagram showing an embodiment of the trial writing circuit suitable for the optical disk apparatus of the present invention.

FIG. 13 shows another configuration of the reproducing signal processing circuit of the present invention. The difference in configuration from the embodiment of FIG. 1 is that the circuit of FIG. 13 operates (1) to generate an error pulse from a digitally equalized signal by the FIR filter 13, and (2) to use the result of the PRML decoder 14 as a binarization result. The object of such a configuration is (1) to compensate a fast recording/reproduction speed and the difference in the numerical aperture of an object lens, and (2) to utilize the binarization result of the higher performance PRML decoder 14 in order to detect an edge from a signal in which the S/N ratio is deteriorated corresponding to the high speed. Corresponding to the configuration and the object (2), an edge detector 23 detects an edge of a digital signal, and a delay only for a path memory occurs in the binarization of the PRML decoder 14. Accordingly, a reproducing signal must be delayed by a delay adjust circuit 24 to adjust this delay. The configuration of this embodiment is designed to realize the foregoing two objects, but only one of the two objects can also be realized easily.

Figure 14:
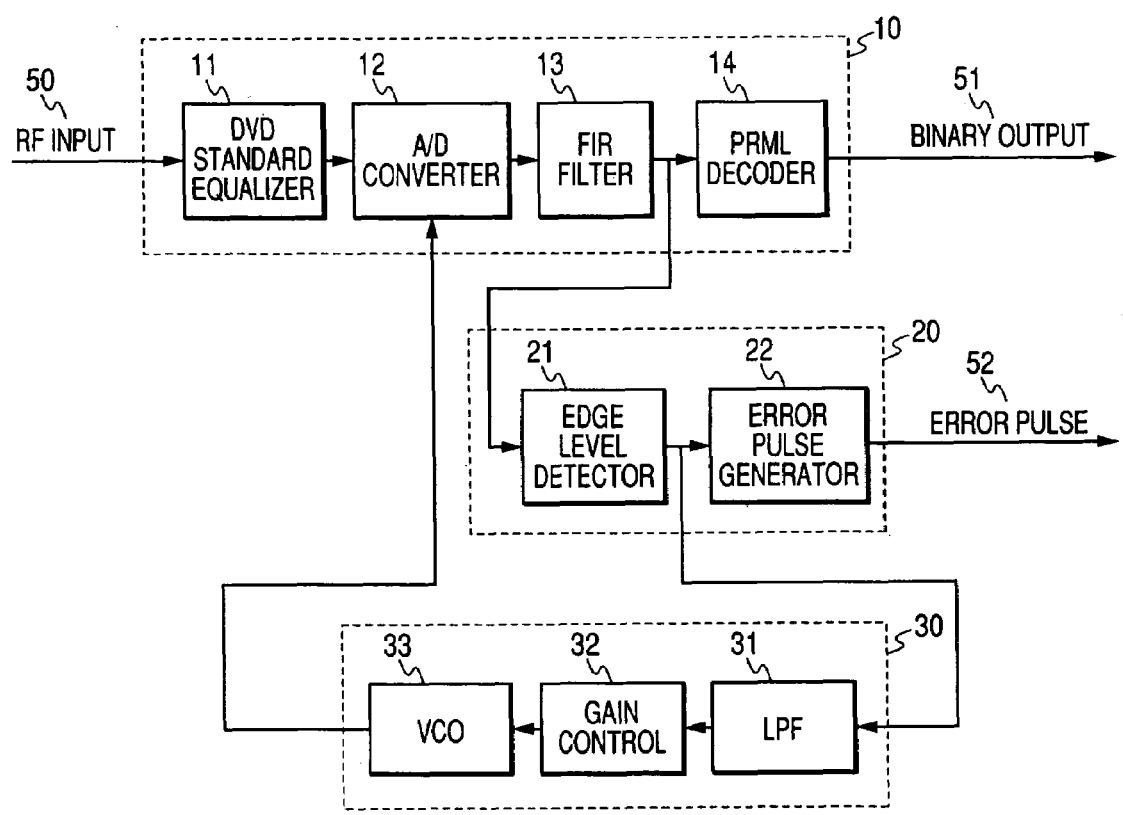
FIG. 14 is a block diagram showing an embodiment of the trial writing circuit suitable for the optical disk apparatus of the present invention.

FIG. 14 shows another configuration of the reproducing signal processing circuit of the present invention. The characteristic feature of this configuration lies in the fact that the details of the digital PLL circuit 30 are shown. The digital PLL circuit 30 has an LFP (lowpass filter) 31, a gain control 32, and a VCO (Voltage Controlled Oscillator) 33. The edge level detector 21 performs the foregoing operation. In this configuration, because the edge level detector 21 can be utilized in common for both generating an error pulse and operating a PLL circuit, the circuit scale can be simplified.

Figure 15:
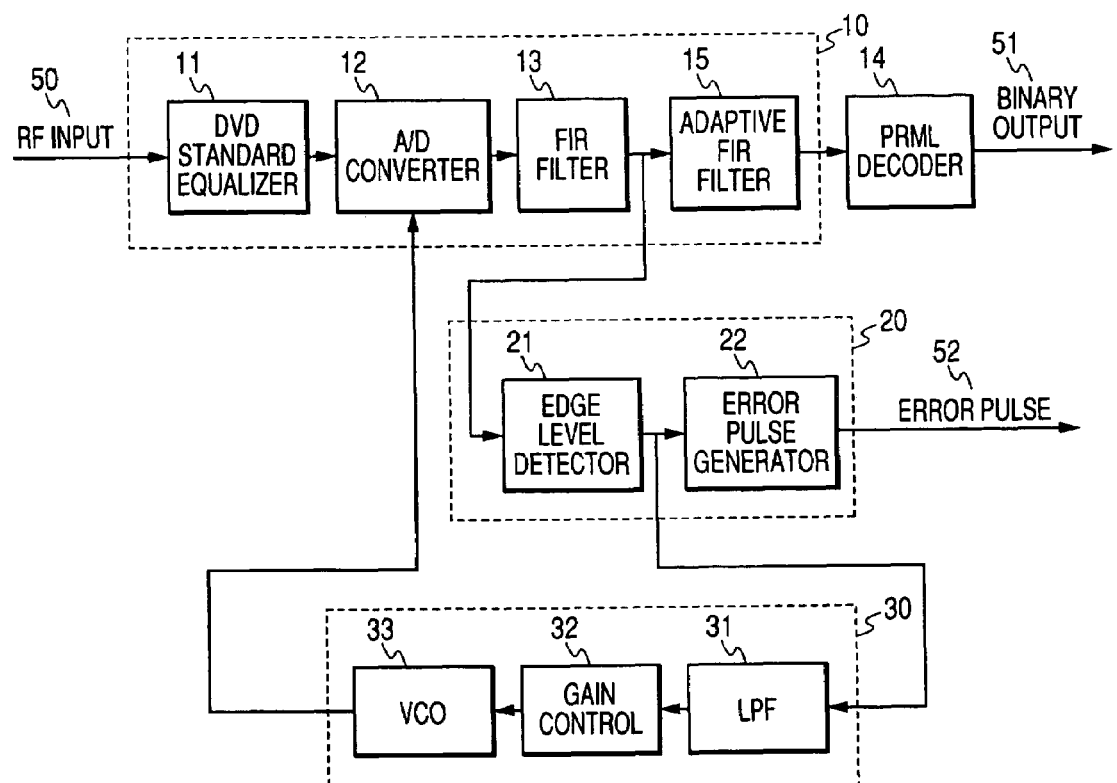
FIG. 15 is a block diagram showing an embodiment of the trial writing circuit suitable for the optical disk apparatus of the present invention.

FIG. 15 shows another configuration of the reproducing signal processing circuit of the present invention. The characteristic feature of this configuration lies in the fact that the adaptive FIR filter 15 is arranged at the previous stage of the PRML decoder 14, based on FIG. 14. Usually, the PRML decoder 14 compares the whole reproducing signal with a reference signal and decodes it into a digital bit row in which the closest reference signal is generated. Accordingly, the optimum signal to a PRML decoder-differs from an error pulse or a PLL circuit in which attention is paid to only an edge of a signal. Usually, in order to compensate the difference of this characteristic, it very effective for improving the reproduction performance of an optical disk apparatus that a reproducing signal should be equalized by the adaptive FIR filter 15 so as to obtain a characteristic that is suitable for the PRML decoder. Tap coefficients of the adaptive FIR filter 15 may be updated sequentially by a well known LSE (Least Square Error, also referred to as an LMS or MSE) method.

Figure 16:
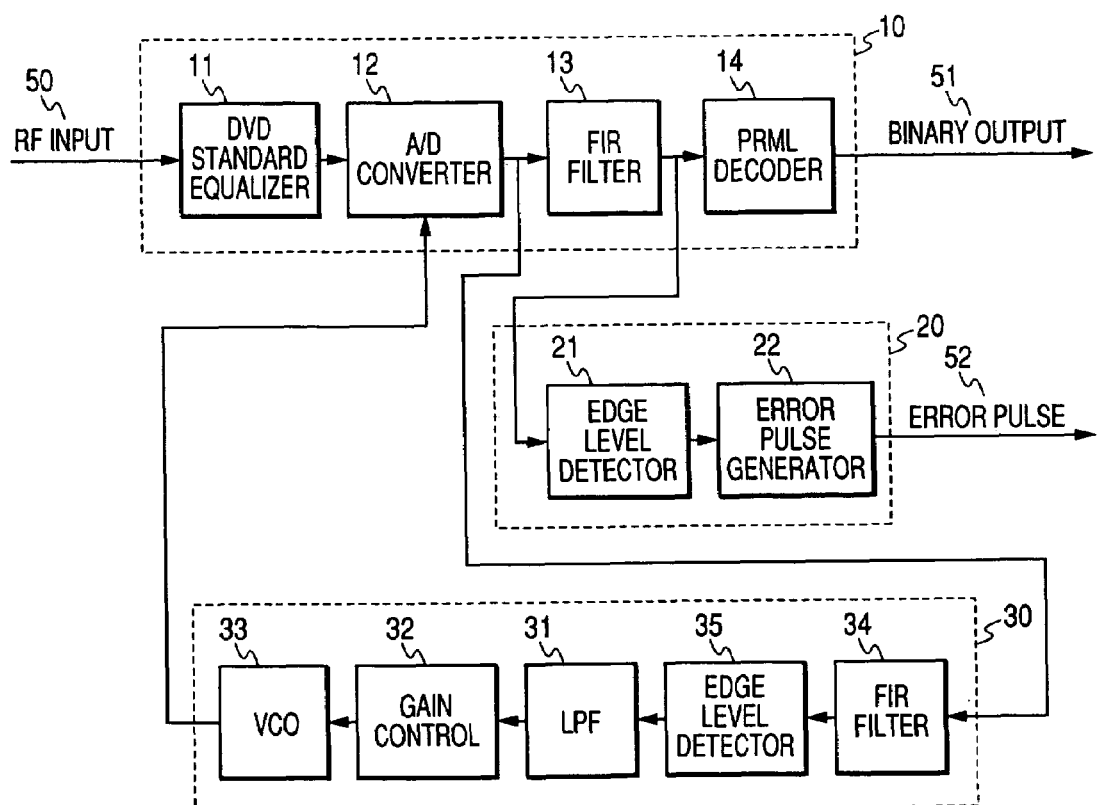
FIG. 16 is a block diagram showing an embodiment of the trial writing circuit suitable for the optical disk apparatus of the present invention.

FIG. 16 shows another configuration of the reproducing signal processing circuit of the present invention. The characteristic feature of this configuration lies in the fact that an exclusive FIR filter 34 for a PLL and an edge level detector 35 are added, based on FIG. 14. In case of high-density recording or high-speed recording, the resolution or S/N ratio of a signal having the minimum run length is reduced in particular. In case of such a digital reproducing processing circuit, however excellent a PRML decoder may be, the PLL circuit is locked, and the PRML decoder can operate normally only under the condition where a clock is supplied stably. Accordingly, the stability of the PLL circuit is most important for the reproducing signal processing circuit. In the case described above, when priority is taken over the stability of the PLL circuit first, in most cases, desirably, the signal amplitude of the minimum run length should be amplified further. On the other hand, a signal having an edge shift of less than ±5% must be supplied to an error pulse generation circuit so that a defect may not be generated in the recording/reproduction compatibility. When both cannot be utilized in common with a single FIR filter, this configuration may be adapted.

Second Embodiment

Reproduction and Compensation

An experimental result in which data was recorded/reproduced in a DVD-RAM practically, using the trial writing circuit described above, will be described below.

Figure 18:
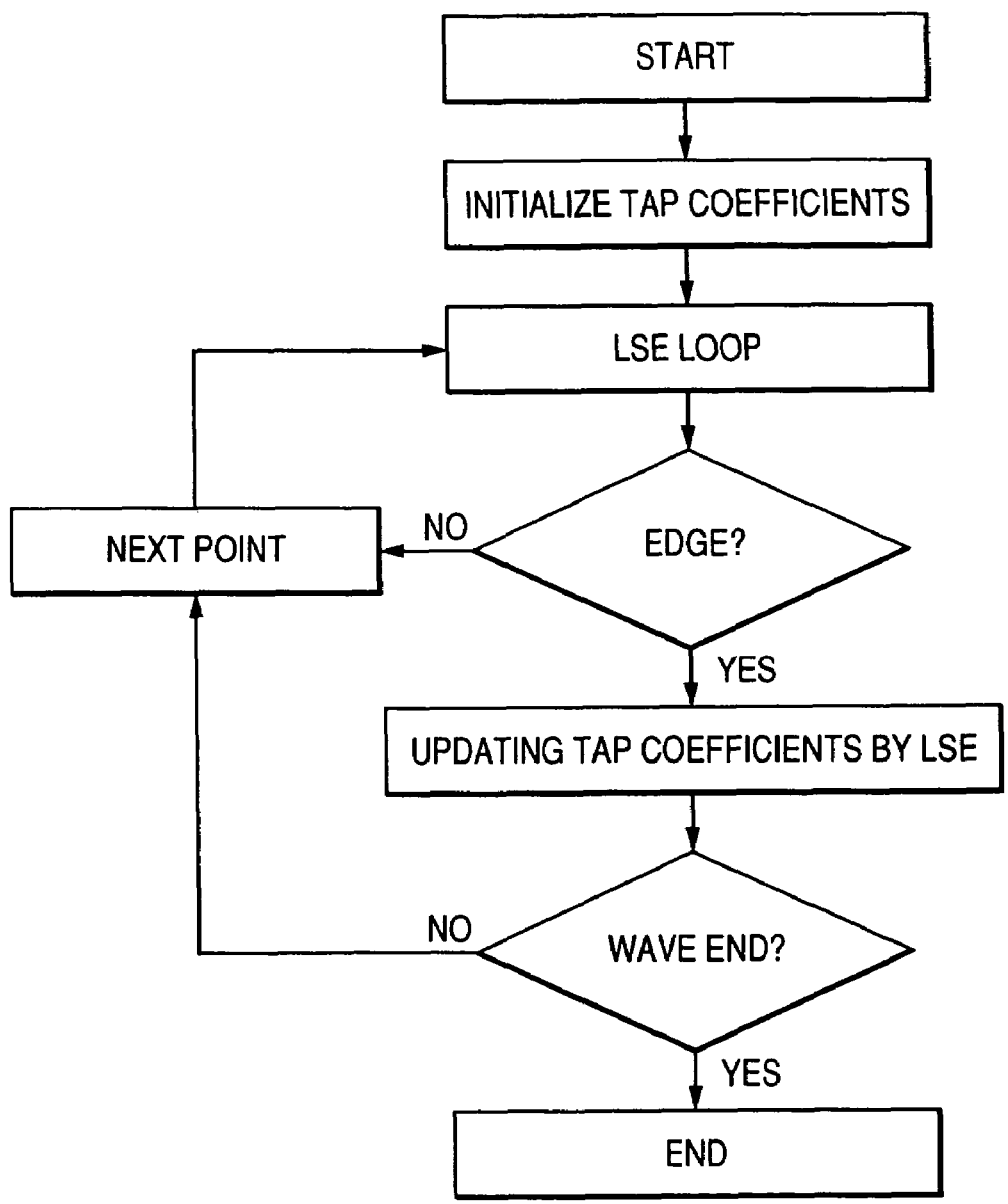
FIG. 18 is a flow diagram showing an equalization learning method for allowing a learning loop of an LSE method to have an edge detection function.

FIG. 17 shows another result in which the edge shift of each 10 pattern was measured in apparatuses having numerical apertures of 0.65 and 0.60. It was described in the previous example that a difference in the numerical aperture is dealt with by properly selecting a boost. However, the drawing shows a result in which the FIR filter 13 is allowed to have a numerical aperture conversion function using the circuit shown in FIG. 13. The tap number of the FIR filter 13 is set to 15, and a tap coefficient is selected by adapting an adaptive equalization technique of a PRML decoder. As described previously, the PRML decoder compares the whole reproducing signal with a reference signal and decodes it into a digital bit row in which the closest reference signal is generated. Moreover, the adaptive equalization by an LSE method sequentially updates the tap coefficients based on the concept of the least squares method, so that the square errors of the whole reproducing signal and the whole reference signal may be minimized. Because this is a characteristic that differs from an error pulse in which attention is paid to an edge shift, the tap coefficient of the FIR filter 13 must not be selected using the LEE method itself. In this case, the method of updating the tap coefficient was used by improving a conventional LSE method, paying attention to only an edge level. Because the method itself, as shown in FIG. 18, has a simple configuration in which a learning loop of the LSE method is allowed to have an edge detection function, and because it should be understood easily, the details of the operation are not described here.

Incidentally, here, a targeted PR class comes into question. A PRML decoder generates a reference signal by superimposing the PR class that is the approximation of an impulse response of a reproducing signal. Normally, desirably, the PR class that enables reproduction at an amply low error speed should be used. For example, in the case of a DVD-RAM, the PR(3,4,4,3), the class bit number of which is 4, is used frequently. When the class bit number increases, the error with the reproducing signal is reduced, but, the increase is undesirable because the circuit scale increases almost in proportion to the square of the class bit number. On the other hand, here, because the object is to guarantee reproduction compatibility, a higher accurate approximation is required. As a result of attempting several methods, the method of directly approximating an impulse response from the reproducing signal equalized under the standard equalizing condition (boost 5.5 dB for the DVD-RAM) in an apparatus having a practical standard numerical aperture of 0.60 proves to be satisfactory. Besides, direct approximation can also be executed based on a scalar diffraction calculation.

Practically, a PR (1.0,2.8,3.8,3.8,2.8,1.0) having the class bit number 6 was used. Accordingly, the reproducing signal of an apparatus having a numerical aperture of 0.60 can be made to approximate thereto. When a tap coefficient for an apparatus having a numerical aperture of 0.65 is determined, a DVD-RAM standard equalizer is used as an analog equalizer, and the foregoing class and the LSE method of FIG. 18 were used. As a result, as shown in FIG. 17, the edge shifts of the 4×4 patterns reproduced in the apparatus having the numerical aperture of 0.65 prove approach 0 and to improve in comparison with the result shown in FIG. 12.

Figure 19A:
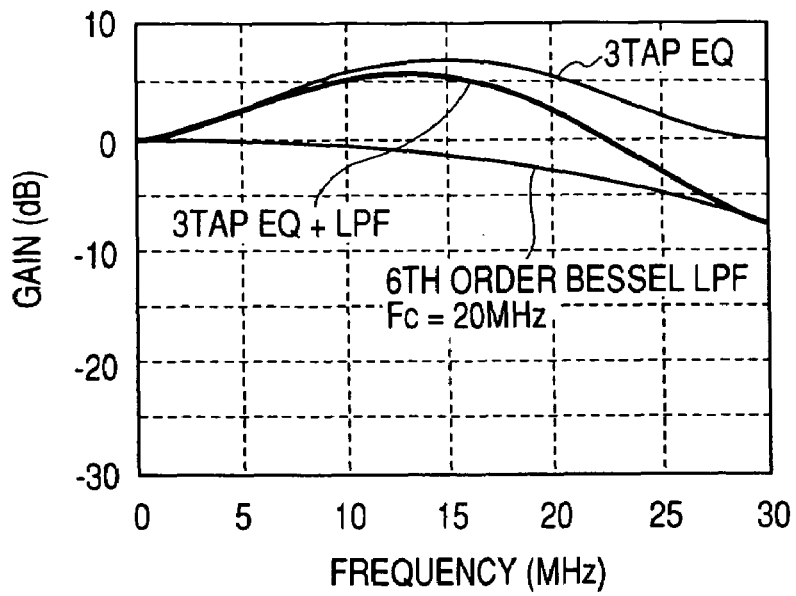
FIGS. 19A and 19B are graphs which show a frequency characteristic of a FIR filter obtained from the LSE method.
Figure 19B:
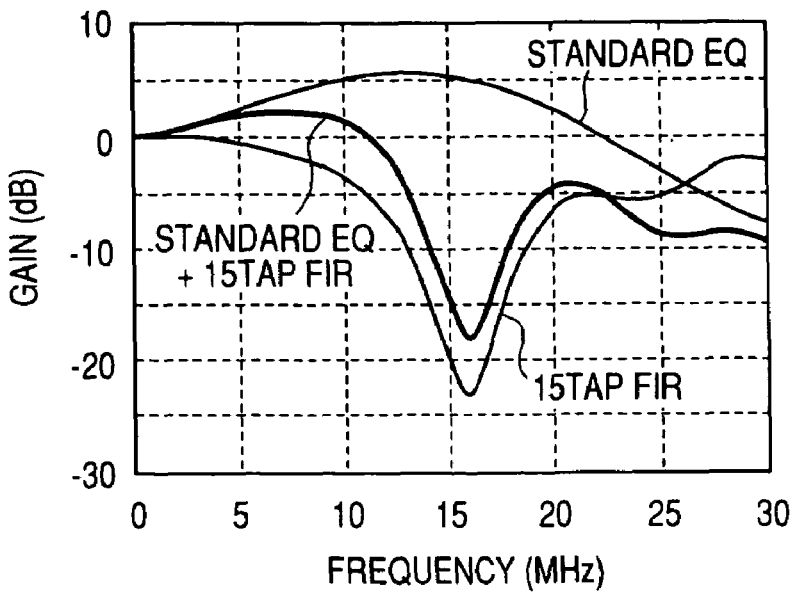

FIGS. 19A and 19B show a frequency characteristic of a FIR filter obtained by an LSE method. FIG. 19A shows the standard equalization characteristic of a 2×-speed DVD-RAM, and the FIR filter has a 3 tap FIR filter and a 6th order Bessel LPF. FIG. 19B shows a learning result in an apparatus having numerical aperture of 0.65. The frequency of the repetition pattern of a 3T signal is about 10 MHz, and the FIR filter shows the characteristic of a lowpass filter that reduces the gain of a signal of less than 15 MHz. This proves to work so as to compensate an increase in the resolution caused by the difference in numerical aperture. The gain peak that can be seen at about 20 MHz does not contribute to the characteristic of a reproducing signal in particular.

A result in which data of a commercially available DVD-RAM medium was recorded/reproduced at a 2×-speed was considered above. The improvement under this condition is small. However, the case where this data was extended into the 2×- to 16×-speeds shows that the recording/reproduction compatibility cannot be established without this technique. The details will be described later.

FIG. 20 shows the reproducing signal between a DVD-RAM standard equalizing condition and the equalizing condition optimized to a PR(3,4,4,3)ML and the difference of an edge shift. Tap coefficients of the FIR filter having the tap number 15 were obtained using the reproducing signal of an apparatus having a numerical aperture of 0.60, and using a normal LSE method for equalizing the PRML. As shown in the figure, the resolution of an eye pattern is 37% in the DVD-RAM standard equalization, while the resolution for the PR(3,4,4,3)ML is 59%, which differs greatly. After this result is reflected, the edge shifts of 4×4 patterns of a PR(3,4,4,3)ML signal reach a maximum of 10% and increase in the portion concerned with the 3T mark and space in particular. Accordingly, the write pulse condition is adjusted using an error pulse so that the edge shift of a signal equalized for the PR(3,4,4,3)ML may be minimized. In this case, when the signal is reproduced by another apparatus, a problem. Two methods for solving this problem are described below.

(1) In case of trial writing, an attempt is made not to change the signal frequency characteristic by a FIR filter. Specifically, in the configuration of FIG. 13, as the tap coefficients of the FIR filter, only the center tap is set to "1", and the other taps should be set to "0". In case of normal recording/reproduction, an attempt is made to set a value suitable for a PR(3,4,4,3)ML.

(2) An exclusive equalizer for a PRML decoder is provided. Specifically, as the configuration shown in FIG. 15, an adaptive FIR filter is allowed to have a conversion function from a standard equalizing condition to an equalizing condition suitable for the PR(3,4,4,3)ML.

The main point of the present invention common to either case is to adjust the write pulse condition using the standard equalizing condition of reproduction compatibility as the equalizing condition when trial writing is executed. The experimental result for a 16×-speed DVD is described below.

Figure 21:
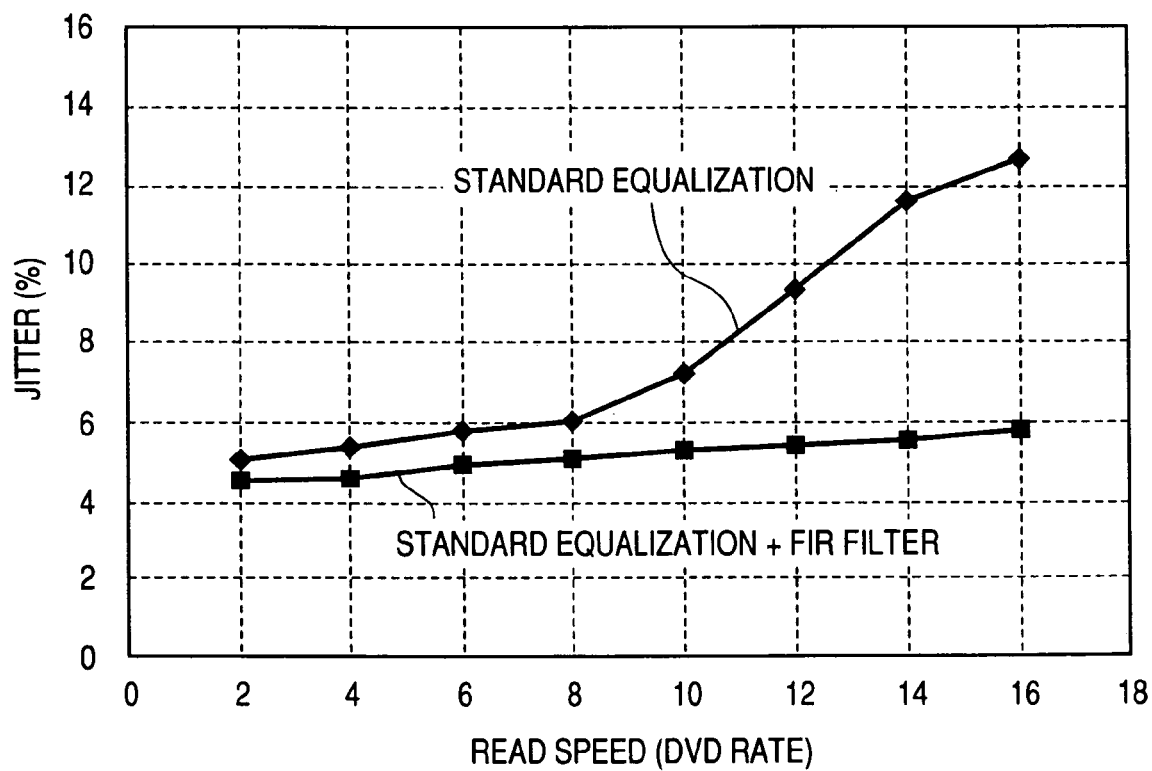
FIG. 21 is a graph which shows a result in which a track recorded at a 2×-speed is reproduced within the range of the 2×- to 16×-speeds, and in which the jitter is measured.

FIG. 21 shows a result in which a track recorded at a 2×-speed is reproduced within the range of the 2×- to 16×-speeds in an apparatus having a numerical aperture of 0.60, and the jitter was measured. As the high performance of an optical disk apparatus and the medium advances, the recording/reproduction speed becomes fast. However, as described repeatedly, the reproduction compatibility must be guaranteed in trial writing. On the other hand, when the same track is reproduced at high speed, (1) the S/N ratio is reduced with an increase in the effects of amplifier and laser noises, and (2) the jitter increases with a relative increase in a delay group in accordance with the band characteristic of an I-V amplifier. In both, with regard to (1), the problem can be solved by introducing a PRML technique, and correcting and binarizing the decreased S/N ratio. However, with regard to (2), the problem is left as is in view of the recording/reproduction compatibility. FIG. 21 shows two results when the track is reproduced in the DVD-RAM standard equalizing condition, and when it is reproduced and compensated by a FIR filter. Here, because the DVD-RAM standard equalizing condition is defined at a 2×-speed, the jitter was measured by sequentially changing the equalizing condition in proportion to speed at this time. In case of the standard equalizing condition, the jitter that was about 5% at the 2×-speed exceeds 12% when the track is reproduced at the 16×-speed.

On the other hand, when a track is reproduced and compensated by a FIR filter, the jitter can be reduced to less than 6% even if it is reproduced at a 16×-speed. The reproduction and compensation by the FIR filter that was used here will use the same technique as the case where the signal reproduced above in an apparatus having a numerical aperture of 0.65 is adaptively equalized and learned aiming at a reproducing signal in an apparatus having a numerical aperture of 0.60, and paying attention to an edge. Specifically, a PR class is generated as a reference signal from the reproducing signal having the standard 2×-speed, and the tap coefficients of the FIR filter were obtained so that the error between the reproducing signal and the reference signal may be minimized at reproduction speeds.

Here, a qualitative description is added to the frequency characteristic and noise of an I-V amplifier. The band of the I-V amplifier is defined under the condition where the gain is reduced by 3 dB. For example, in the case of a DVD-RAM, when a track is reproduced at a 16×-speed, the frequency of a repetition signal having the minimum run length (3T) reaches about 80 MHz. The I-V amplifier having at least two times the band of 80 MHz is required to reproduce this signal satisfactorily. The performance of the I-V amplifier depends on an optical detector, a conversion resistance value, and an IC process. Usually, restrictions in which the product of a band and a gain (should be regarded as the inverse of the noise) becomes almost constant are imposed in the same manner as the performance index of a transistor or an operational amplifier.

Accordingly, when a broadband I-V amplifier is used, the amplifier noise increases. The I-V amplifier for an optical head used in an optical disk apparatus is designed and selected so that the apparatus performance may be maximized under such restrictions. In such a case, when the reproduction band of 160 MHz is secured, as described in the above example, the noise increases. Accordingly, an apparatus, the band of which was restricted to about 120 MHz, is required to obtain satisfactory apparatus performance. Here, the band of the apparatus used in an experiment is 110 MHz. In case of normal data reproduction, such a characteristic is considered so as to ignore any problem. To use an I-V amplifier having a performance that guarantees recording/reproduction compatibility for trial writing is undesirable because the noise increases as a result. Thereupon, in a system in which the reproduction band of the I-V amplifier is not sufficiently wide, a method of realizing a guarantee of the recording/reproduction compatibility by the reproduction and compensation described here is required.

Figure 22:
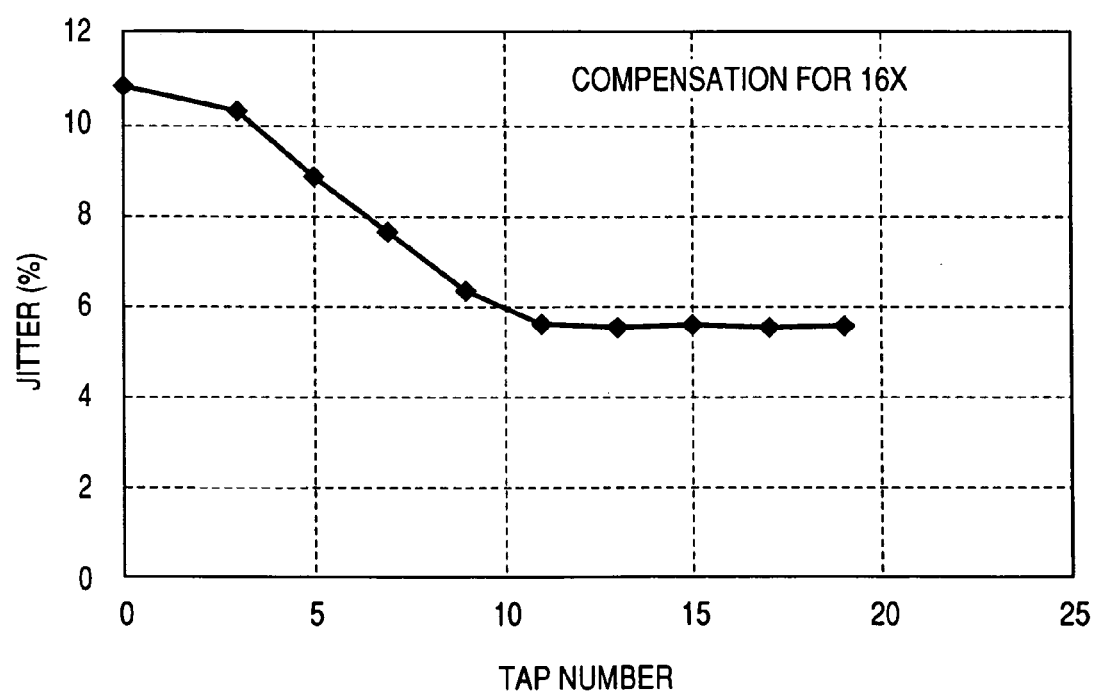
FIG. 22 is a graph which shows an experimental result in which the relationship between a tap number (the number of taps) of the FIR filter for reproduction and compensation at the 16×-speed and the jitter is measured.

FIG. 22 shows an experimental result in which the relationship between the tap number and the jitter of a FIR filter for reproduction and compensation was measured at a 16×-speed. Tap coefficients were obtained as described previously. As shown in the figure, when the tap number exceeds 5, the jitter starts to be reduced remarkably. When the tap number exceeds 9, the jitter was shown to be saturated as a characteristic. Here, the tap number is set to 15, leaving a sufficient margin. However, when a tap is mounted on an optical disk apparatus, the tap number should be reduced as much as possible to reduce the circuit scale. This must be considered carefully for every drive apparatus together with the design of the 1-V amplifier, as described above.

Figure 23:
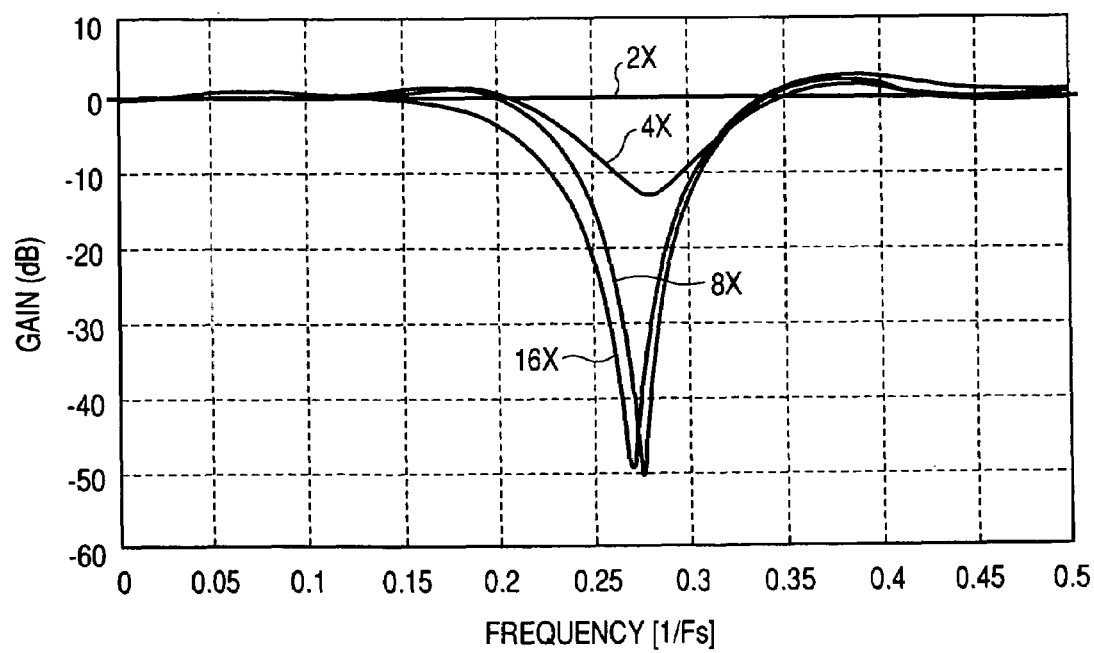
FIG. 23 is a graph which shows a frequency characteristic of the FIR filter for the reproduction and compensation.

FIG. 23 shows a frequency characteristic of a FIR filter for reproduction and compensation. The drawing shows the frequency characteristic of the FIR filter at 2×-, 4×-, 8×-, and 16×-speeds, as an example. Because the FIR filter operates in synchronization with a channel clock, the frequency on the horizontal axis is standardized using the channel clock. The frequency of a repetition signal having the minimum run length (3T) is 0.167.

Because a 2×-speed is the standard used in recording/reproduction, a FIR filter has a characteristic of passing through a reproducing signal as is. At this time, specifically, as already described, only the coefficient of the center tap is set to "1", and another coefficient should be set to "0". The frequency characteristic of the FIR filter depends on each speed. The difference in the characteristic for a frequency of less than 0.167 is mainly used to compensate a group delay. The minimal value of a gain shown in the vicinity of the frequency of 0.25 has the effect of a lowpass filter, and it improves the S/N ratio.

Figure 24A:
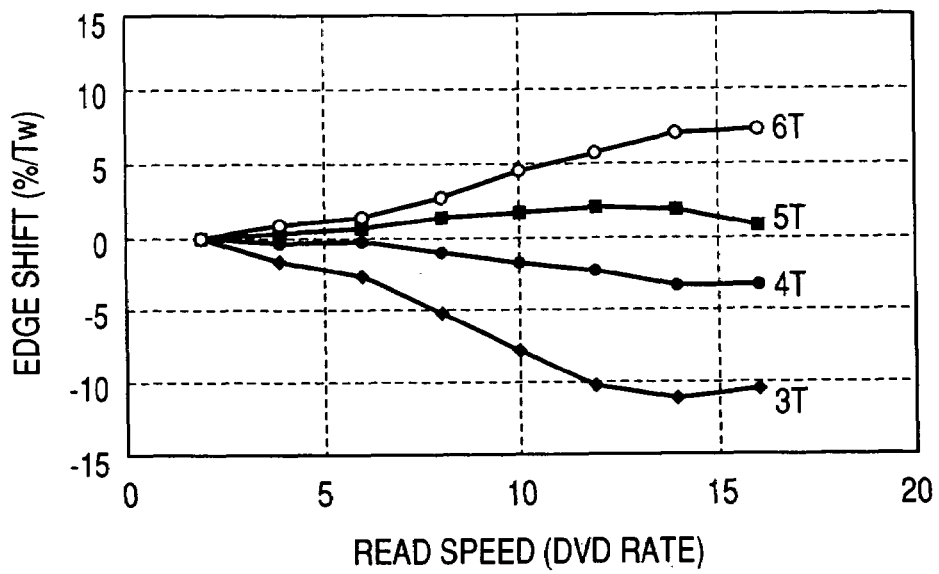
FIGS. 24A and 24B are graphs which show an experimental result showing a suppression effect of a group delay by the FIR filter for the reproduction and compensation.
Figure 24B:
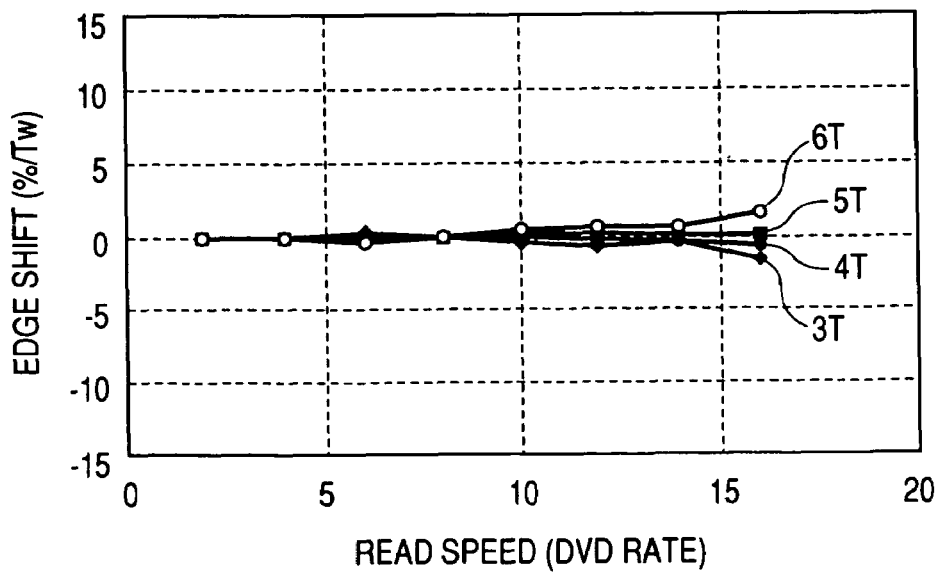

FIGS. 24A and 24B show an experimental result showing the suppression effect of a group delay by a FIR filter for reproduction and compensation. FIG. 24A shows average edge shifts in the case of the DVD-RAN standard equalization. The edge shift on the vertical axis averages the measurement result of the edge shift in the foregoing 4×4 patterns in each mark length of 3T, 4T, 5T, or 6T. Assuming that a 2×-speed is the standard, the edge proves to shift about −10% for mark length of the 3T and about +7% for the mark length of 6T, respectively, at a 16×-speed. This does not satisfy the condition of less than 5% for the recording/reproduction compatibility described previously. On the other hand, when a signal is reproduced and compensated by the FIR filter, as shown in FIG. 24B, the edge shift is almost determined, and the condition of less than 5% for the recording/reproduction compatibility is satisfied.

Thus, the tap coefficients of a FIR filter are set to values in which a standardized shift becomes almost constant. In this shift, when a signal recorded in an optical medium is reproduced at a speed that differs from a reference speed, the edge position of a reproducing signal that was obtained by equalizing the signal by the FIR filter was standardized using a clock at that speed.

FIG. 25 shows an eye pattern and a jitter at each speed when reproduction and compensation are applied or not. At a 16×-speed particularly, the improvement of the signal quality proves to be remarkable.

FIG. 26 shows tap coefficients of a FIR filter for reproduction and compensation at each speed. The drawing shows that the edge position is standardized so that the DC gain may be set to 1.

As described above, reproduction and compensation should 10 be performed using a FIR filter in order to execute trial writing and to guarantee recording/reproduction compatibility when an I-V amplifier mounted on an optical head does not have a flat frequency characteristic corresponding to a high-speed DVD apparatus. When an attempt is made to guarantee the recording/reproduction compatibility without using the present invention, for example, trial writing data is recorded at a 16×-speed, and a method of executing the reproduction at a 2×-speed every time must be adopted. In such a case, the time followed by acceleration and deceleration is reflected by an increase of the disk loading time as is. This will cause an undesirable situation for users. The present invention is an effective technique for a high-speed optical disk even with respect to the reduction of the loading time.

Trial Writing Result

The trial writing method and circuit that make effective use of a conventional error pulse processing circuit and a software resource, and which will guarantee recording/reproduction compatibility were described above. Here, an example in which the trial writing was executed using such a method will be described.

Figure 27A:
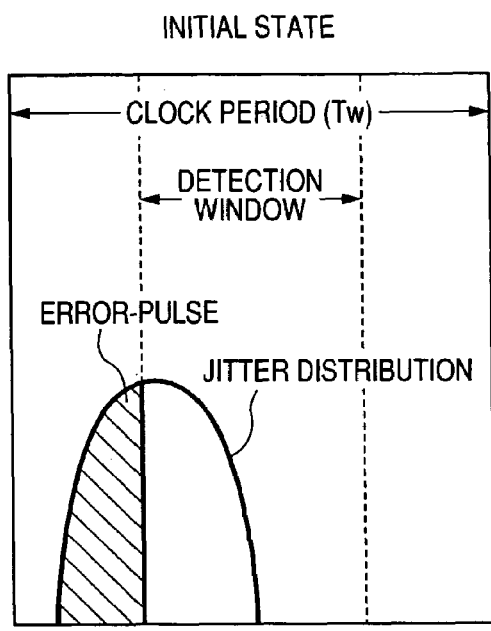
FIGS. 27A and 27B are characteristic diagrams showing a concept of the trial writing that optimizes a write pulse condition.
Figure 27B:
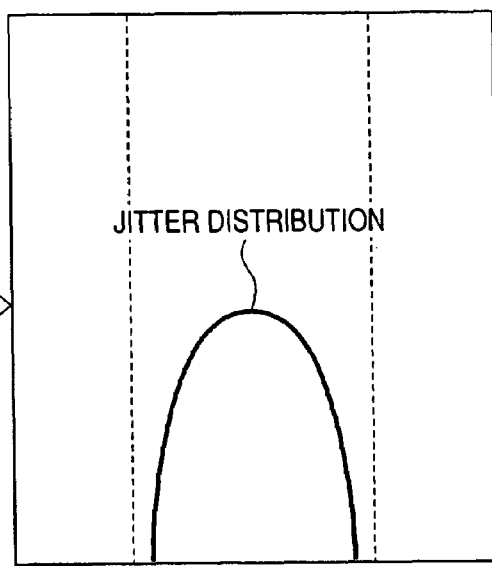

FIGS. 17A and 17B are diagrams showing the concept of trial writing that optimizes a write pulse condition. FIG. 27A shows an initial state, and the distribution of jitter when a specific edge is shifted. In the figure, the edge in the hatched region outside of an error pulse detection window clock period is counted as an error pulse. FIG. 27B shows the case where a write pulse is adjusted so that the error pulse count may be minimized when the trial writing terminated. The distribution of the jitter enters an error pulse detection is clock period and an edge shift is corrected.

Figure 28:
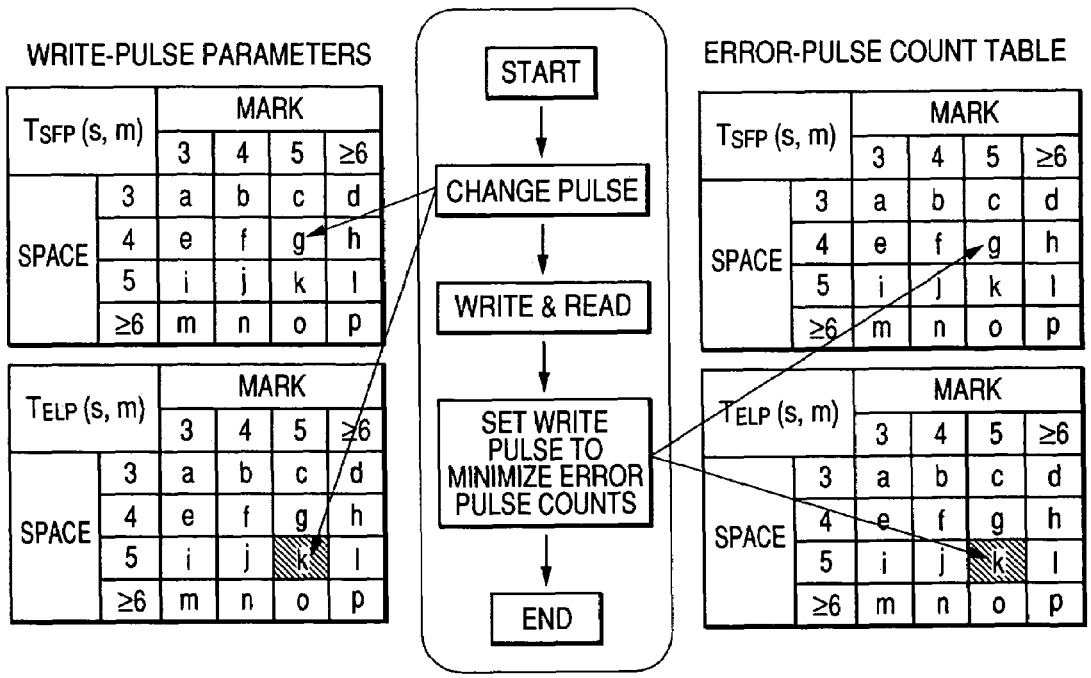
FIG. 28 is a diagram showing a flow of the trial writing that optimizes the write pulse condition.

FIG. 28 is a diagram showing a flow of trial writing that optimizes a write pulse condition. In case of a DVD-RAM, a write-pulse parameter is defined in a 4×4 table at the leading and trailing edges, respectively. An error pulse counter classifies an error pulse to the edge pattern of the same 4×4 table as this. A simple sequence first changes the write pulse condition, records it in an optical disk medium, reproduces the foregoing sector, estimates a count value of the corresponding error pulse, and determines the write-pulse parameter so as to minimize this count value. As is clear from this example, because a write-pulse parameter and an error pulse that is its estimated value correspond 1 to 1, the trial writing time can be reduced by changing multiple write-pulse parameters at a time, and performing recording/reproduction, then, at the same time, optimizing the multiple write-pulse parameters in parallel. Specifically, when the write-pulse parameter is determined sequentially from the end, a 2×-speed drive apparatus requires a processing time of 30 seconds to one minute. On the contrary, when parallel processing executed by the present invention, the trial writing can be terminated for about one second.

FIGS. 29A and 29B show an example of trial writing that determines a write pulse of a 2×-speed DVD-RAM medium on the market. The drawing shows, with regard to six patterns that have the 6T space behind and before, the edge position of the write pulse and the result of the error pulse count. In the figure, the zero point on the horizontal axis represents the determined condition. Thus, a write pulse condition is selected and the trial writing processing can be executed so that the error pulse count may be minimized.

Figure 30:
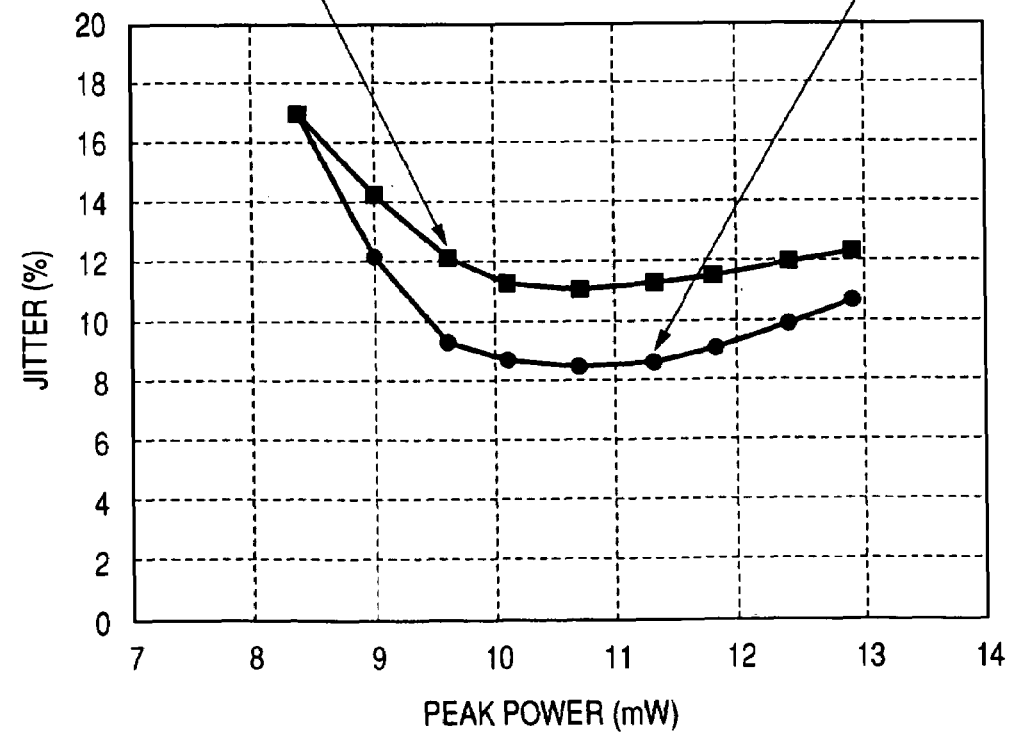
FIG. 30 is a diagram showing an experimental result showing a difference in a recording power margin before and after the time the trial writing is executed.

FIG. 30 shows a difference in the recording power margin before and after trial writing is executed. After the 4×4 table of a write-pulse parameter was all determined by the foregoing trial writing processing, the relationship between recording power and a jitter was measured. As shown in the figure, the jitter is improved by the trial writing of the present invention, and a satisfactory recording power margin can be obtained.

FIG. 31 shows a result of trial writing of a DVD-RAM medium for 6×- to 16×-speeds that is being developed. The drawing shows bit error rates measured using jitter and a PR(3,4,4,3)ML decoder in which, at the 6×-speed and the 16×-speed, trial writing is executed using the error pulse count stated above, a write pulse condition is determined, a track is created after writing is performed once and overwrite is performed ten times, and the track is reproduced at a 2×-, 6×-, and 16×-speeds, respectively. As shown in the figure, in both the 6×-speed writing and the 16×-writing, when the track is reproduced at the 2×-speed, the jitter of the first-time writing is less than 5% and the writing can be controlled satisfactorily. Moreover, because an optical disk medium is still being developed, the rise of the jitter by the overwrite is large. However, because the jitter is 9% when the track is written/reproduced at a 16×-speed, a specification value (less than 9%) will be able to have been satisfied. With regard to the bit error rate, even when the track is overwritten at either speed, and even when the track is reproduced at any speed, a satisfactory value, such as a bit error rate of less than $10^{-6}$, can be obtained. Needless to say, the reproduction and compensation as described are applied in this experimental data.

Fourth Embodiment

Optical Disk Apparatus

Figure 32:
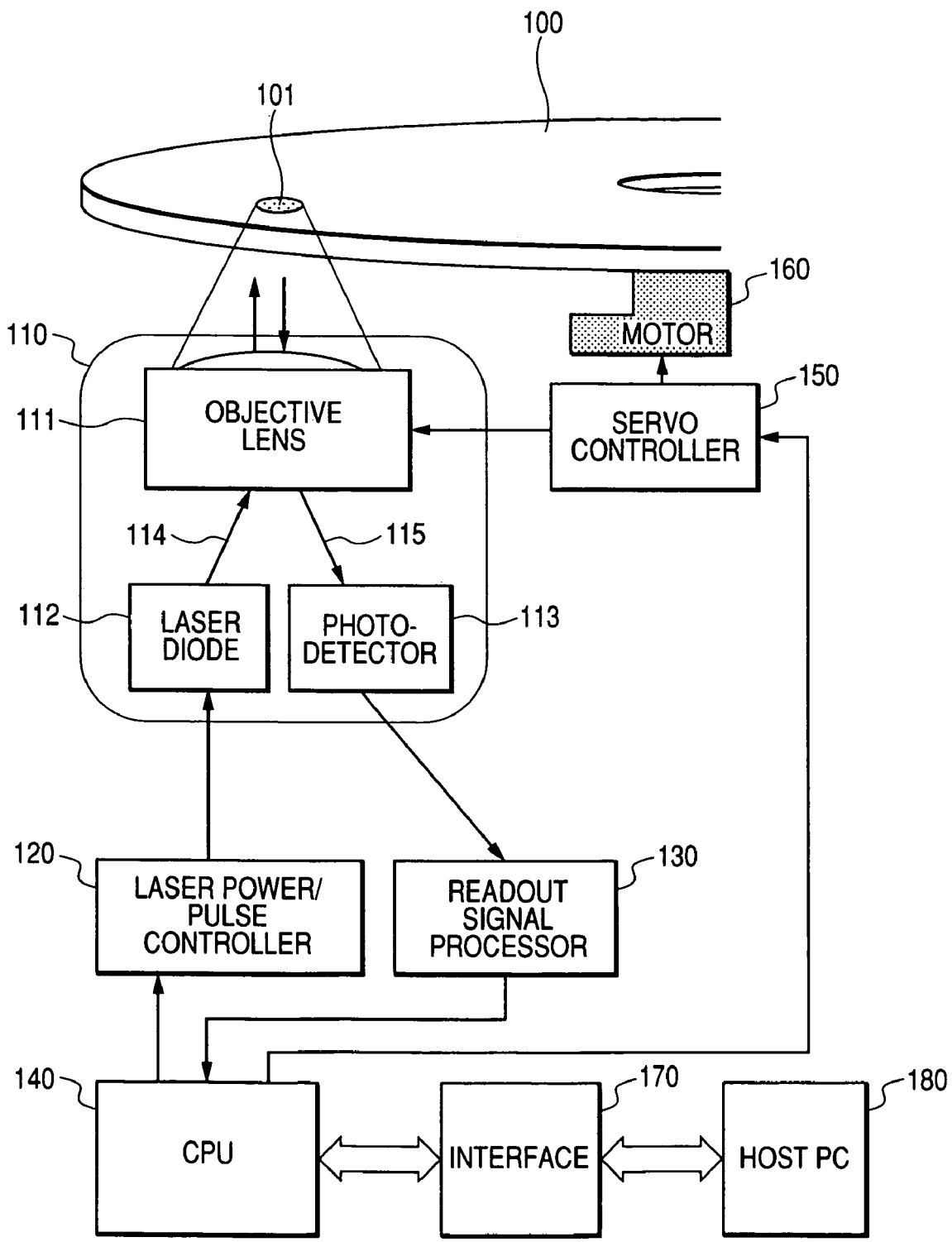
FIG. 32 is a block diagram showing an embodiment of the optical disc system of the present invention.

FIG. 32 shows an embodiment of an optical disk apparatus of the present invention. An optical disk medium 100 is rotated by a motor 160. A laser power/pulse controller 120 controls a current that flows into a semiconductor laser 112 inside an optical head 110, and it generates a laser beam 114 so as to produce an optical intensity as instructed by the CPU 140 in case of reproduction. The laser beam 114 is condensed by an objective lens 111, and forms an optical spot 101 on the optical disk medium 100. Reflected light 115 from this optical spot 101 is detected by an optical detector 113 through the objective lens 111. The optical detector has multiple split optical detection elements. A reproducing signal processing circuit 130 reproduces information recorded in the optical disk medium 100 using a signal detected by the optical head 110. In case of recording, the laser power/pulse controller 120 converts predetermined recording data into a predetermined write pulse current, and it controls the current so that pulse light may exit from the semiconductor laser 112. The signal processing circuits 40 and 50 for the foregoing trial writing shown in FIG. 1 are incorporated in the reproducing signal processing circuit 130.

In the case of trial writing, a predetermined data pattern is recorded/reproduced according to the instruction of the CPU 140, and recording power and write pulse conditions are optimized using an error pulse as an index.

When the optical disk apparatus of the present invention is used, trial writing can be executed, in which a reproduction circuit of a PRML system is mounted and a change occurs in the characteristic of a reproducing signal, that is mainly followed by the frequency characteristic of an I-V amplifier, as the high speed advances, with the result that the recording/reproduction compatibility is guaranteed. At the same time, even when an optical head having the numerical aperture of 0.65, for example, corresponding to various standards, it is possible for the optical head to acquire the compatibility with a standard apparatus having a numerical aperture of 0.60. At this time, needless to say, a logic circuit and a software resource can be used effectively corresponding to a conventional error pulse.

Moreover, the foregoing embodiments were described with reference to a DVD-RAM medium. However, this description can easily apply to a writable DVD medium in the same manner, such as a DVD-R, DVD-RW, DVD+R, or DVD+RW. Specifically, the standard equalizing condition should be changed according to each standard. For example, in the case of the DVD-RW medium, the standard boost is 3.2 dB. At the same time, application is enabled also for a Blu-ray Disc using a blue laser. Because a RLL (1, 7) code used as a modulation code in the Blu-ray Disc, the minimum run length is set to 2T and the resolution is reduced. The present invention cannot cope with the condition under which the amplitude of a 2T signal is set to 0, and the capacity of about 30 GB (gigabytes) for the Blu-ray Disc. In this case, a new technique based on a PRML system is necessary.

The present invention is applied in particular to a large capacity optical disk apparatus.

What is claimed is:

1. An optical disk apparatus that records and reproduces information by irradiating an optical disk medium with an optical laser pulse, and performs trial writing that optimizes the laser pulse irradiating condition, comprising:
    a means of recording a predetermined trial writing pattern in a predetermined region of the optical disk medium changing the laser beam irradiating condition;
    a means of reproducing the predetermined data, and obtaining a first reproducing signal;
    an analog filter that equalizes the first reproducing signal and obtains a second reproducing signal;
    an A/D converter that digitalizes the second reproducing signal and obtains a third reproducing signal;
    a FIR filter that equalizes the third reproducing signal and obtains a fourth reproducing signal;
    a PRML circuit that binarizes the fourth reproducing signal and obtains a binarized data row;
    an edge level detector that uses the third reproducing signal as input and detects a signal level of an edge;
    a logical pulse generator that judges that the signal level of the edge is outside the range of a predetermined value and generates a logical pulse; and
    a means of judging a data pattern in accordance with the preceding space length, the preceding mark length, and the succeeding space length from the binary data row, counting the logical pulses in units of the data patterns and generating a logical pulse table,
    wherein the laser pulse irradiating condition is decided using a count value in the logical pulse table.

2. The optical disk apparatus according to claim 1, wherein the laser pulse irradiating condition is decided so as to minimize the count value in the logical pulse table.

3. The optical disk apparatus according to claim 1, wherein tap coefficients of the FIR filter are set to values in which a standardized shift becomes almost constant, and in this shift, when a signal recorded in an optical medium is reproduced at a speed that differs from a reference speed, the edge position of the fourth reproducing signal obtained by equalizing the signal by the FIR filter is standardized using a clock at the speed.

4. The optical disk apparatus according to claim 1, wherein tap coefficients of the FIR filter are switched in the case of execution of trial writing, and in the case of reproduction of user data.

5. The optical disk apparatus according to claim 1, wherein the FIR filter prevents a frequency characteristic of a signal from being changed in the case of trial writing, and changes the frequency characteristic in the case of recording/reproduction.

6. The optical disk apparatus according to claim 1, wherein the tap coefficient of the FIR filter is sequentially updated based on the edge signal level.

7. An optical disk apparatus that records and reproduces information by irradiating an optical disk medium with an optical laser pulse, and performs trial writing that optimizes the laser pulse irradiating condition, comprising:
    a means of recording a predetermined trial writing pattern in a predetermined region of the optical disk medium changing the laser beam irradiating condition;
    a means of reproducing the predetermined data, and obtaining a first reproducing signal;
    an analog filter that equalizes the first reproducing signal and obtains a second reproducing signal;
    an A/D converter that digitalizes the second reproducing signal and obtains a third reproducing signal;
    a FIR filter that equalizes the third reproducing signal and obtains a fourth reproducing signal;
    a PRML circuit that binarizes the fourth reproducing signal, and obtains a binary data row;
    an edge detector that detects an edge position from the binary data row;
    an edge level detector that detects a signal level of an edge from the fourth reproducing signal and the edge detector; and
    a logical pulse generator that judges that the signal level of the edge is outside the range of a predetermined value and generates a logical pulse.

8. The optical disk apparatus according to claim 7, wherein a delay adjuster that compensates a delay of a component for generating the binary data row is provided between the FIR filter and the edge detector.

9. The optical disk apparatus according to claim 7, further comprising:
    a means of judging a data pattern in accordance with the preceding space length, the preceding mark length, and the succeeding space length from the binary data row, counting the logical pulses in units of the data patterns, and generating a logical pulse table; and
    a means of determining the laser beam irradiating condition using a count value in the logical pulse table.

10. The optical disk apparatus according to claim 7, wherein tap coefficients of the FIR filter are switched in the case of execution of trial writing and in the case of reproduction of user data.

11. The optical disk apparatus according to claim 7, wherein the tap coefficient of the FIR filter is sequentially updated based on the edge signal level.

12. An optical disk apparatus that records and reproduces information by irradiating an optical disk medium with an optical laser pulse, and performs trial writing that optimizes the laser pulse irradiating condition, comprising:
    a means of writing a predetermined trial writing pattern to a predetermined region of the optical disk medium changing the laser beam irradiating condition;
    a means of reproducing the predetermined data and obtaining a first reproducing signal;

an analog filter that equalizes the first reproducing signal and obtains a second reproducing signal;

an A/D converter that digitalizes the second reproducing signal and obtains a third reproducing signal;

a FIR filter that equalizes the third reproducing signal and obtains a fourth reproducing signal;

a PRML circuit that binarizes the fourth reproducing signal and obtains a binary data row;

an edge level detector that detects an edge position of the fourth reproducing signal and detects a signal level of an edge;

a logical pulse generator that judges that the signal level of the edge is outside the range of a predetermined value, and generates a logical pulse; and a PLL circuit that uses an output signal from the edge level detector as an input signal, wherein the output signal of the PLL circuit is used as the input signal of the A/D converter sampled every clock.

13. The optical disk apparatus according to claim 12, wherein the PLL circuit includes a lowpass filter, a gain controller, and a VCO.

14. The optical disk apparatus according to claim 12, further comprising:

an adaptive FIR filter between the FIR filter and the PRML circuit so that the fourth reproducing signal may have a characteristic suitable for the PRML circuit.

15. The optical disk apparatus according to claim 12, further comprising in the PLL circuit:

an exclusive PLL FIR filter; and an exclusive PLL edge level detector.

16. The optical disk apparatus according to claim 12, further comprising:

a means of judging a data pattern in accordance with the preceding space length, the preceding mark length, and the succeeding space length from the binary data row, counting the logical pulses in units of the data patterns, and generating a logical pulse table; and a means of determining the irradiation condition of the laser pulse using a count value in the logical pulse table.

17. The optical disk apparatus according to claim 12, wherein tap coefficients of the FIR filter are switched in the case of execution of trial writing and in the case of reproduction of user data.

18. The optical disk apparatus according to claim 12, wherein the tap coefficient of the FIR filter is sequentially updated based on the edge signal level.

* * * * *